US012561932B2

(12) United States Patent
Ishikawa et al.

(10) Patent No.: US 12,561,932 B2
(45) Date of Patent: Feb. 24, 2026

(54) INFORMATION PROCESSING APPARATUS, AND INFORMATION PROCESSING METHOD

(71) Applicant: SONY GROUP CORPORATION, Tokyo (JP)

(72) Inventors: Tsuyoshi Ishikawa, Tokyo (JP); Taihei Meno, Tokyo (JP); Hiroshi Yamaguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 154 days.

(21) Appl. No.: 18/554,805

(22) PCT Filed: Jan. 12, 2022

(86) PCT No.: PCT/JP2022/000671
§ 371 (c)(1),
(2) Date: Oct. 11, 2023

(87) PCT Pub. No.: WO2022/230247
PCT Pub. Date: Nov. 3, 2022

(65) Prior Publication Data
US 2024/0193896 A1 Jun. 13, 2024

(30) Foreign Application Priority Data

Apr. 27, 2021 (JP) ................................. 2021-075058

(51) Int. Cl.
*G06T 19/20* (2011.01)
*G06T 5/70* (2024.01)
(Continued)

(52) U.S. Cl.
CPC ................ *G06T 19/20* (2013.01); *G06T 5/70* (2024.01); *G06V 10/25* (2022.01); *H04N 13/279* (2018.05);
(Continued)

(58) Field of Classification Search
CPC ... G06T 19/20; G06T 5/70; G06T 2219/2004; G06T 2219/2016; G06V 10/25;
(Continued)

(56) References Cited

U.S. PATENT DOCUMENTS

2014/0293022 A1* 10/2014 Okamoto ............. H04N 13/398
348/51
2015/0261003 A1* 9/2015 Morifuji .............. H04N 13/344
345/8
(Continued)

FOREIGN PATENT DOCUMENTS

JP 2013-070286 A 4/2013
WO 2013/069413 A1 5/2013
(Continued)

OTHER PUBLICATIONS

International Search Report and Written Opinion of PCT Application No. PCT/JP2022/000671, issued on Mar. 29, 2022, 08 pages of ISRWO.

*Primary Examiner* — Stacy Khoo
(74) *Attorney, Agent, or Firm* — CHIP LAW GROUP

(57) ABSTRACT

Provided is an information processing apparatus and an information processing method that stereoscopically displays a 3D model by a spatial reproduction display. The information processing apparatus determines, in 3D content presented by a spatial reproduction display that stereoscopically displays a 3D model, a viewpoint position with respect to the 3D model, determines a region of interest including at least a part of the 3D model, acquires a size of a display space for displaying the 3D model, changes, using the 3D model included in the region of interest as a 3D model of interest, a position of the 3D model of interest with respect to the viewpoint position to a position located within the display space on the basis of the viewpoint position, the (Continued)

region of interest, and the size of the display space, and causes the spatial reproduction display to stereoscopically display the 3D model.

20 Claims, 30 Drawing Sheets

(51) Int. Cl.
*G06V 10/25* (2022.01)
*H04N 13/279* (2018.01)
(52) U.S. Cl.
CPC .................. *G06T 2219/2004* (2013.01); *G06T 2219/2016* (2013.01)
(58) Field of Classification Search
CPC .......... G09G 5/36; G09G 5/38; H04N 13/122; H04N 13/128; H04N 13/279; G02B 30/22; G02B 30/26
See application file for complete search history.

(56) References Cited

U.S. PATENT DOCUMENTS

2020/0035036 A1* 1/2020 Hirabayashi ............ G06F 30/23
2021/0174472 A1* 6/2021 Taylor ........................ G06T 5/70

FOREIGN PATENT DOCUMENTS

| WO | WO-2015186439 A1 | 12/2015 |
| WO | 2018/116580 A1 | 6/2018 |
| WO | WO-2020054566 A1 | 3/2020 |

* cited by examiner

G        M    G

117

M$_{R2}$

INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2022/000671 filed on Jan. 12, 2022, which claims priority benefit of Japanese Patent Application No. JP 2021-075058 filed in the Japan Patent Office on Apr. 27, 2021. Each of the above-referenced applications is hereby incorporated herein by reference in its entirety.

TECHNICAL FIELD

The present technology relates to an information processing apparatus, a program, and an information processing method that control a 3D model stereoscopically displayed by a spatial reproduction display.

BACKGROUND ART

A spatial reproduction display is a display that presents a right-eye image and a left-eye image having parallax to a user who views the display and allows a 3D model to be stereoscopically displayed for naked eyes. The user can recognize the 3D model in a particular display space as if the 3D model really exists. As the technology relating to control of a 3D model stereoscopically displayed, for example, Patent Literature 1 discloses the technology in which, in order to improve visibility of a 3D model, a position of a 3D model is adjusted to the same depth position as that of a display surface where there is no difference (no parallax) between videos of right and left eyes.

CITATION LIST

Patent Literature

Patent Literature 1: Japanese Patent Application Laid-open No. 2013-070286

DISCLOSURE OF INVENTION

Technical Problem

In the spatial reproduction display, a 3D model is stereoscopically displayed in a particular display space as described above. Here, there is a possibility that, depending on the arrangement of the 3D model or a viewpoint, a 3D model protrudes from the display space, and a user feels uncomfortable or a stereoscopic effect of the 3D model deteriorates. In the configuration described in Patent Literature 1, the adjustment of the depth position corresponding to the display surface is taken into consideration, but it fails to correct the protrusion from the display space.

In view of the circumstances as described above, it is an object of the present technology to provide an information processing apparatus, a program, and an information processing method that are capable of stereoscopically displaying a 3D model having excellent visibility by a spatial reproduction display.

Solution to Problem

In order to achieve the above object, an information processing apparatus according to the present technology includes a viewpoint position determining unit, a region-of-interest specifying unit, a display space acquiring unit, and a display control unit.

The viewpoint position determining unit determines, in 3D content presented by a spatial reproduction display capable of stereoscopically displaying a 3D model, a viewpoint position with respect to the 3D model.

The region-of-interest specifying unit specifies a region of interest including at least a part of the 3D model.

The display space acquiring unit acquires a size of a display space for displaying the 3D model on the spatial reproduction display.

The display control unit changes, using the 3D model included in the region of interest as a 3D model of interest, a position of the 3D model of interest with respect to the viewpoint position to a position located within the display space on the basis of the viewpoint position, the region of interest, and the size of the display space, and causes the spatial reproduction display to stereoscopically display the 3D model.

The display control unit may change the position of the 3D model of interest to the position located within the display space by reducing a distance between the viewpoint position and the 3D model of interest at a first ratio, and may reduce a size of the 3D model of interest at a second ratio that is identical to the first ratio.

The display control unit may change the position of the 3D model of interest to the position located within the display space by reducing a distance between the viewpoint position and the 3D model of interest at a first ratio, and may reduce a size of the 3D model of interest at a second ratio at which a whole of the 3D model of interest fits in the display space.

The display control unit may reduce a distance between the viewpoint position and the 3D model at the first ratio, and may reduce a size of the 3D model at the second ratio.

The viewpoint position determining unit may move the viewpoint position in accordance with an operation input by a user.

The region-of-interest specifying unit may move the region of interest in accordance with an operation input by a user.

The viewpoint position determining unit may move the viewpoint position in accordance with elapse of time.

The region-of-interest specifying unit may move the region of interest in accordance with elapse of time.

The display control unit may generate a 2D image obtained by projecting the 3D model located outside the display space onto a surface of the display space, and may cause the spatial reproduction display to display the 2D image.

The display control unit may project the 3D model located between the viewpoint position and the display space onto a surface of the display space on a side of the viewpoint position, and may generate the 2D image.

The display control unit may perform blurring processing on the 2D image.

The viewpoint position determining unit may set, as the viewpoint position, a viewpoint position specified in the 3D content.

The viewpoint position determining unit may move a viewpoint position specified in the 3D content such that the display space is positioned on a straight line connecting the viewpoint position and the 3D model of interest, and may set the specified viewpoint position as the viewpoint position.

The region-of-interest specifying unit may specify, as the region of interest, a region of interest specified in the 3D content.

The region-of-interest specifying unit may specify the region of interest on the basis of a detection result of a viewpoint of the user.

The region-of-interest specifying unit may specify the region of interest on the basis of arrangement of the 3D model.

The display control unit may generate a right-eye model image and a left-eye model image that are parallax images of the 3D model viewed from the viewpoint position, and may cause the spatial reproduction display to display the right-eye model image and the left-eye model image, to stereoscopically display the 3D model.

The display control unit may change a direction of the 3D model in accordance with a detection result of a viewpoint of the user.

In order to achieve the above object, a program according to the present technology causes an information processing apparatus to operate as a viewpoint position determining unit, a region-of-interest specifying unit, a display space acquiring unit, and a display control unit.

The viewpoint position determining unit determines, in 3D content presented by a spatial reproduction display capable of stereoscopically displaying a 3D model, a viewpoint position with respect to the 3D model.

The region-of-interest specifying unit specifies a region of interest including at least a part of the 3D model.

The display space acquiring unit acquires a size of a display space for displaying the 3D model on the spatial reproduction display.

The display control unit changes, using the 3D model included in the region of interest as a 3D model of interest, a position of the 3D model of interest with respect to the viewpoint position to a position located within the display space on the basis of the viewpoint position, the region of interest, and the size of the display space, and causes the spatial reproduction display to stereoscopically display the 3D model.

In order to achieve the above object, an information processing method according to the present technology includes: determining, in 3D content presented by a spatial reproduction display capable of stereoscopically displaying a 3D model, a viewpoint position with respect to the 3D model; specifying a region of interest including at least a part of the 3D model; acquiring a size of a display space for displaying the 3D model on the spatial reproduction display; and changing, using the 3D model included in the region of interest as a 3D model of interest, a position of the 3D model of interest with respect to the viewpoint position to a position located within the display space on the basis of the viewpoint position, the region of interest, and the size of the display space, and causing the spatial reproduction display to stereoscopically display the 3D model.

4

Figure 4:
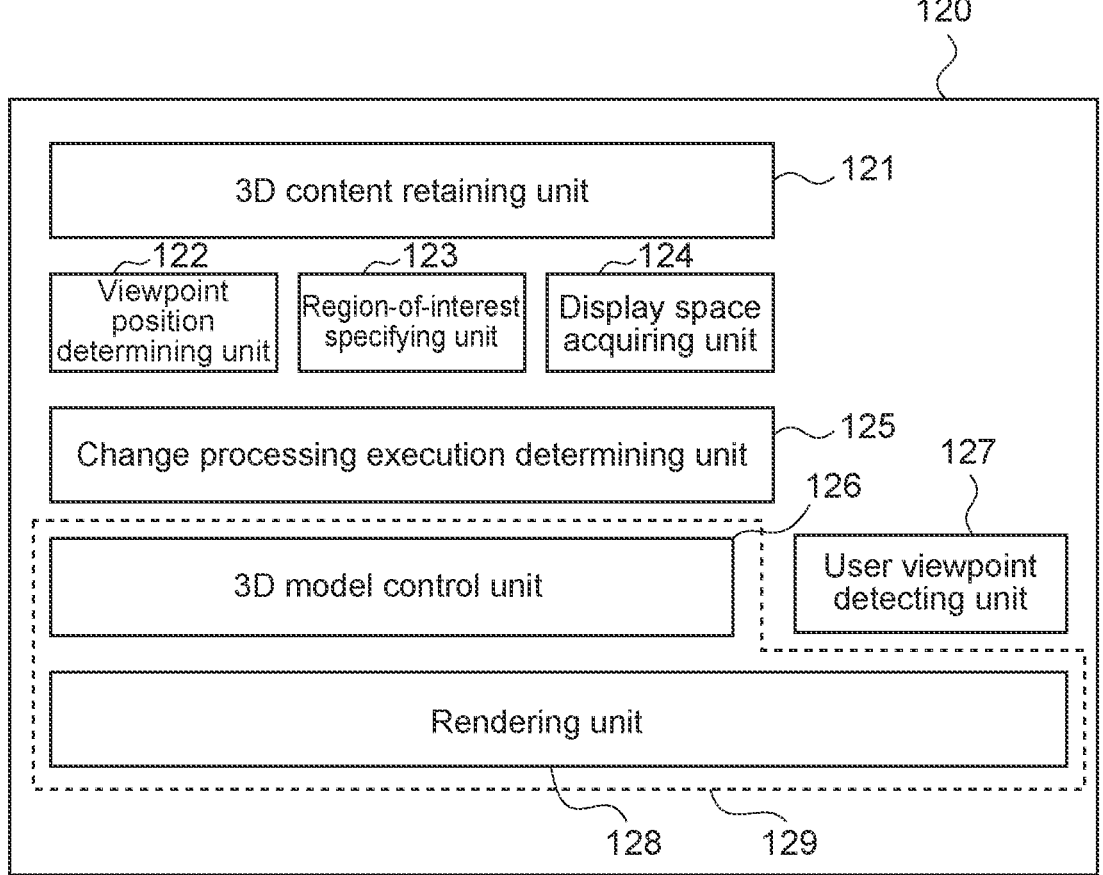

FIG. 4 is a block diagram of an information processing apparatus included in the spatial reproduction display system.

Figure 5:
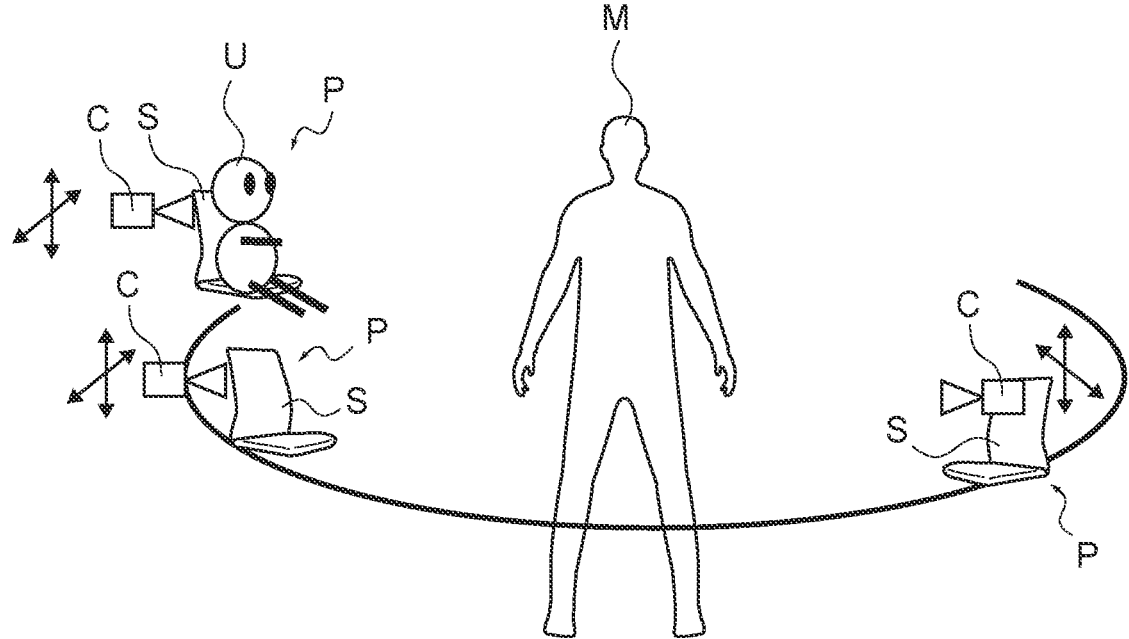

FIG. 5 is a schematic view showing a designated viewpoint position in three-dimensional content.

Figure 6A:
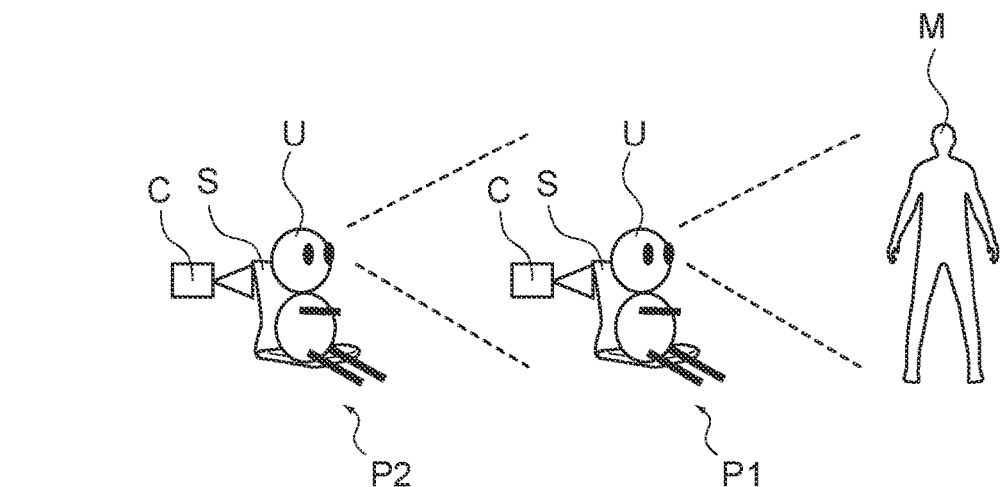
Figure 6B:
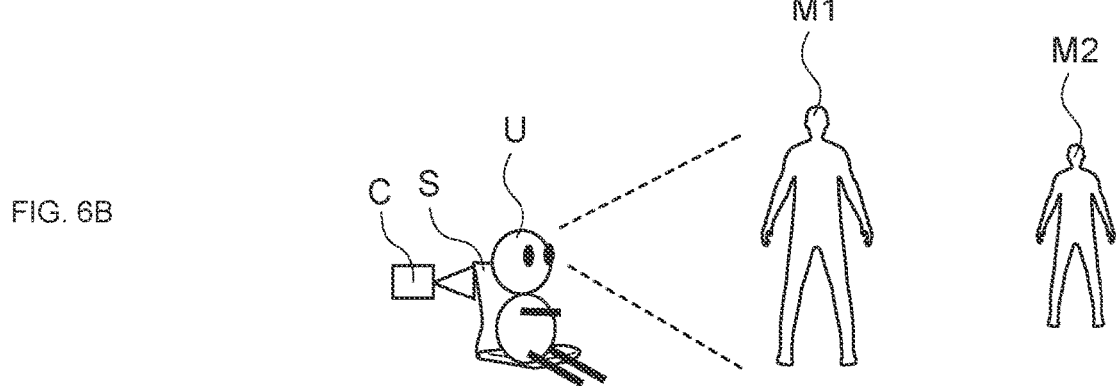

FIGS. 6A and 6B are schematic views showing a relationship between the designated viewpoint position in the three-dimensional content and a 3D model displayed by the spatial reproduction display.

Figure 7A:
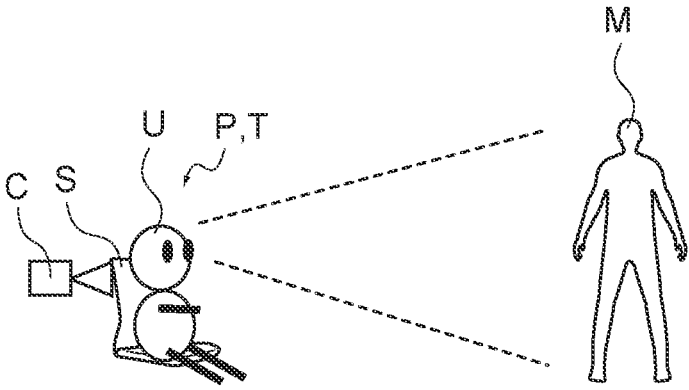
Figure 7B:
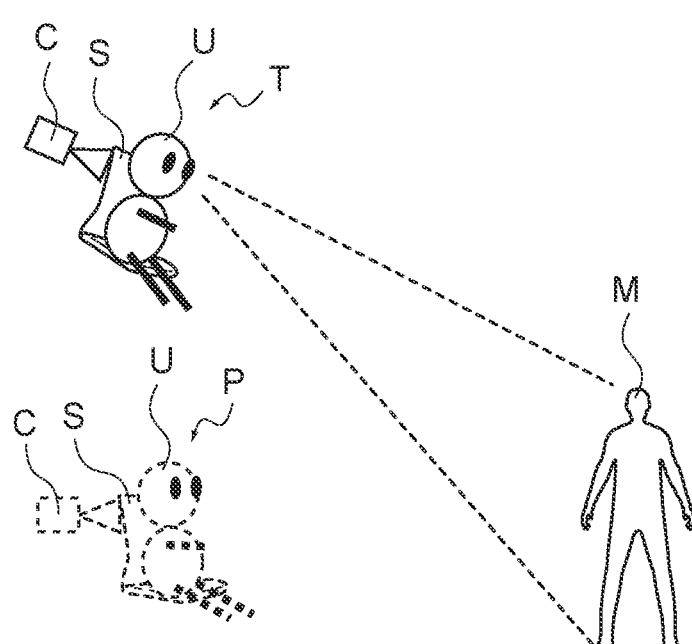

FIGS. 7A and 7B are schematic views showing a display viewpoint position determined by a viewpoint position determining unit included in the information processing apparatus.

Figure 8:
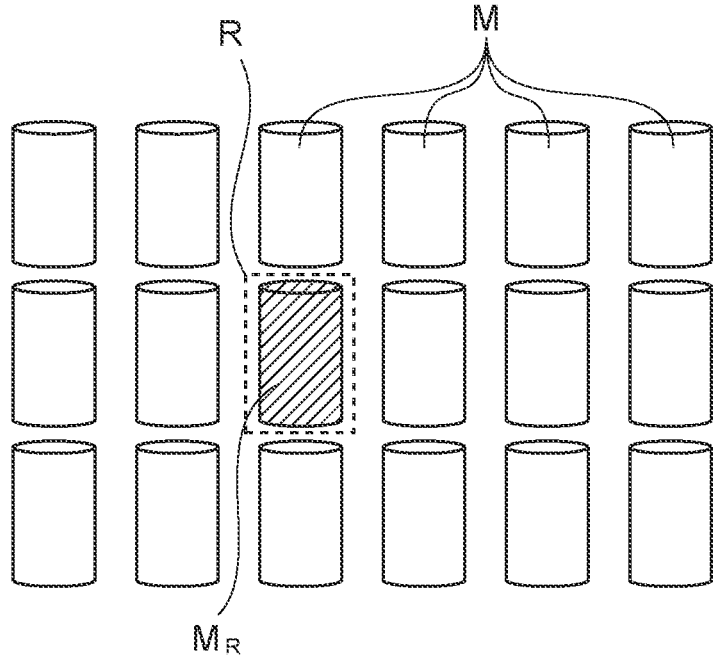

FIG. 8 is a schematic view showing a region of interest specified by a region-of-interest specifying unit included in the information processing apparatus.

Figure 9:
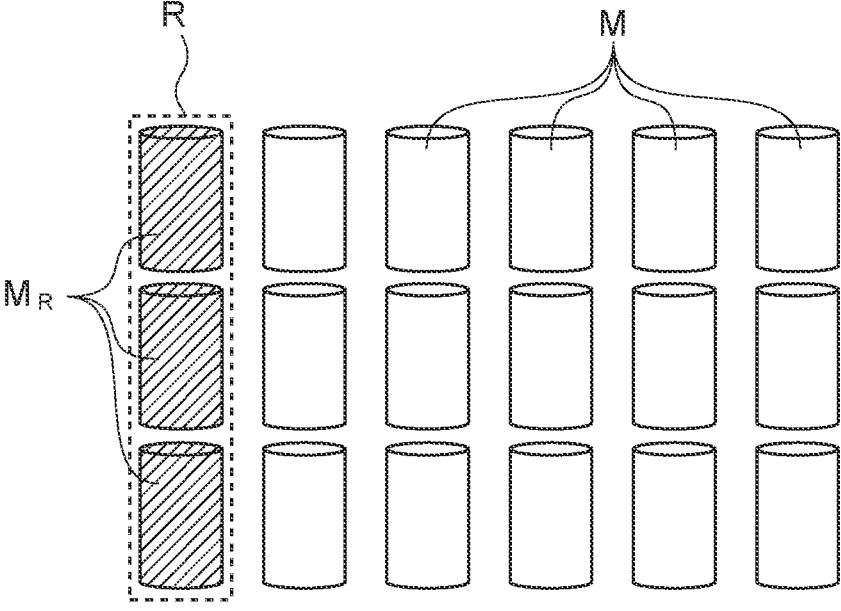

FIG. 9 is a schematic view showing a region of interest specified by the region-of-interest specifying unit included in the information processing apparatus.

Figure 10:
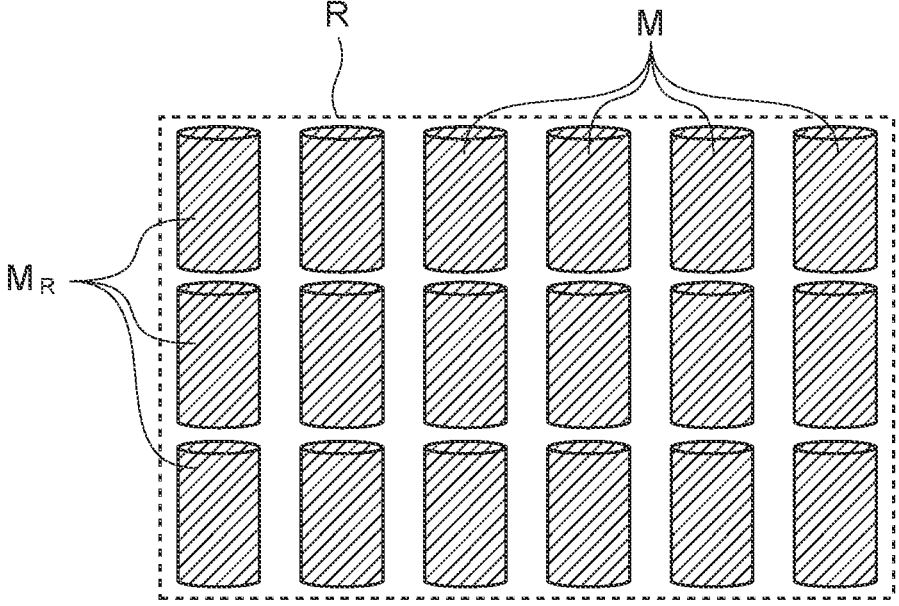

FIG. 10 is a schematic view showing a region of interest specified by the region-of-interest specifying unit included in the information processing apparatus.

Figure 11A:
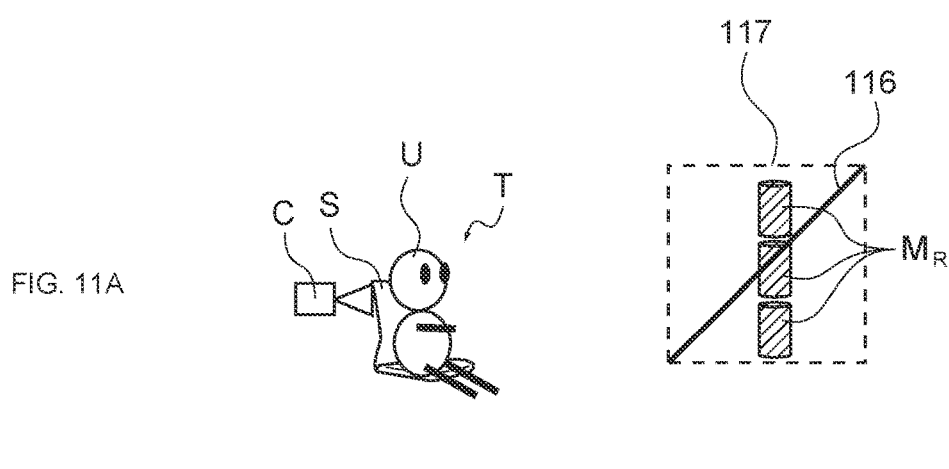
Figure 11B:
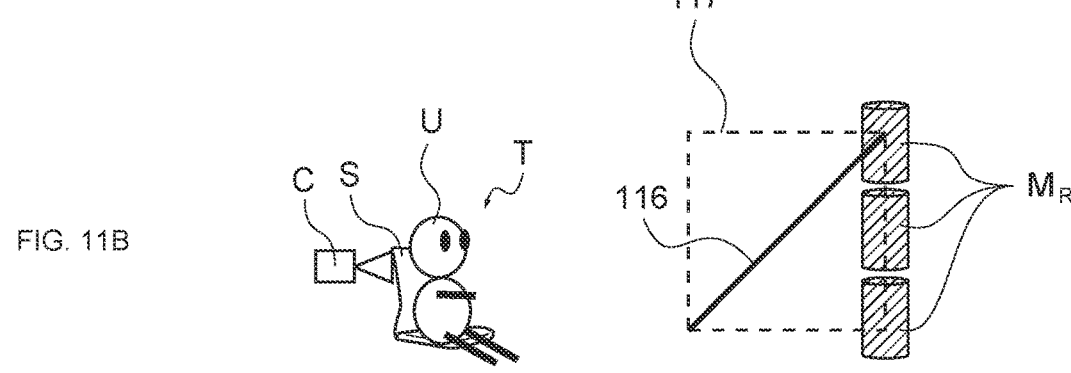
Figure 11C:
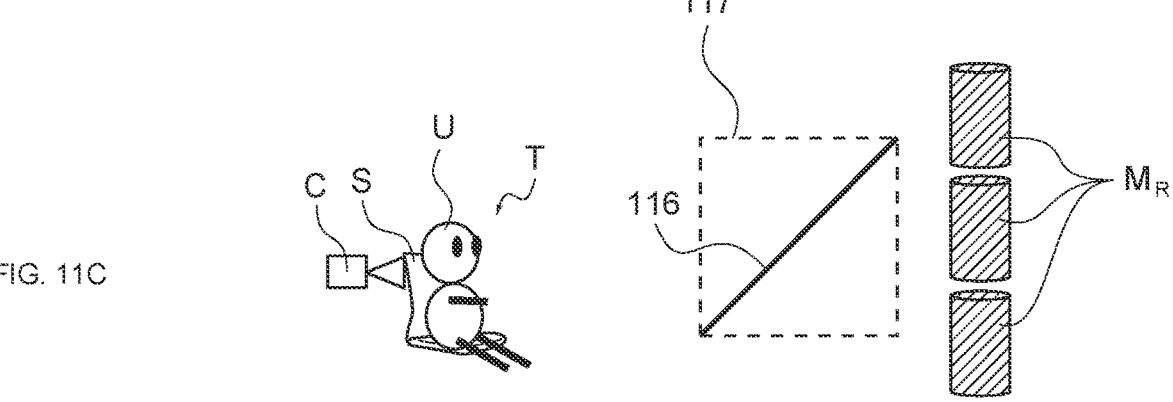

FIGS. 11A, 11B, and 11C are schematic views showing a determining method for change processing by a change processing execution determining unit included in the information processing apparatus.

Figure 12A:
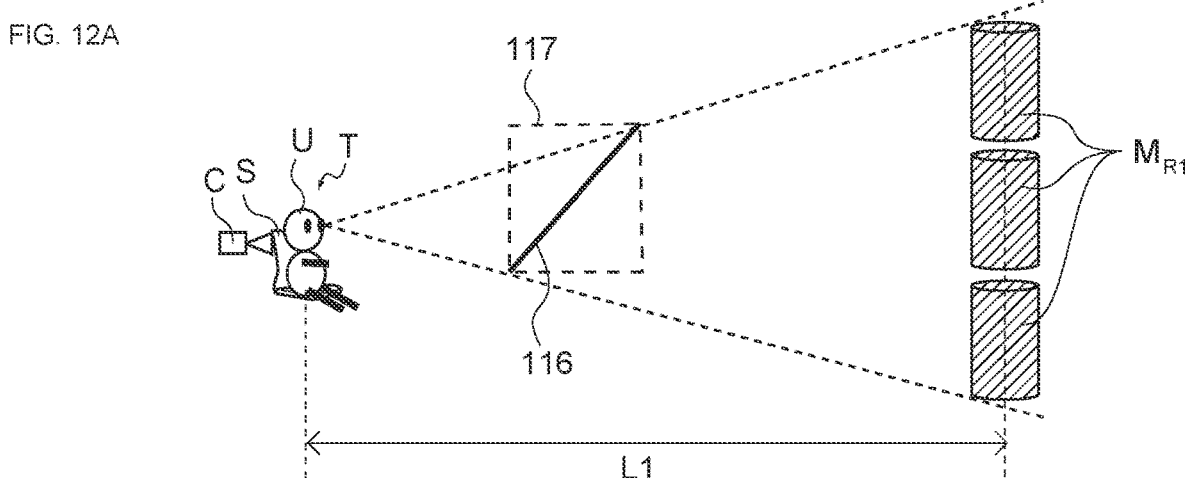
Figure 12B:
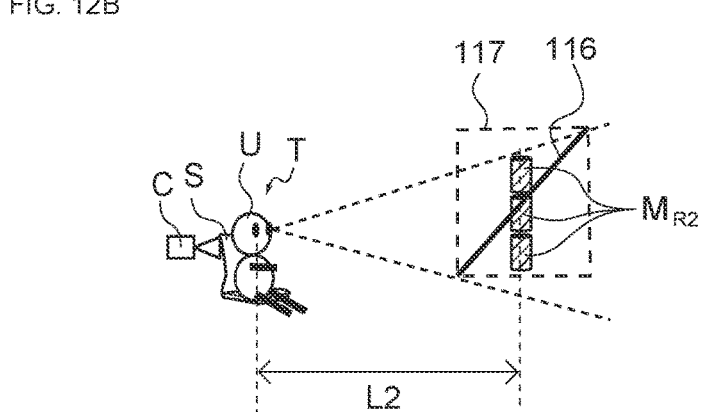

FIGS. 12A and 12B are schematic views showing a change in position and size of a 3D model of interest by a 3D model control unit included in the information processing apparatus.

Figure 13:
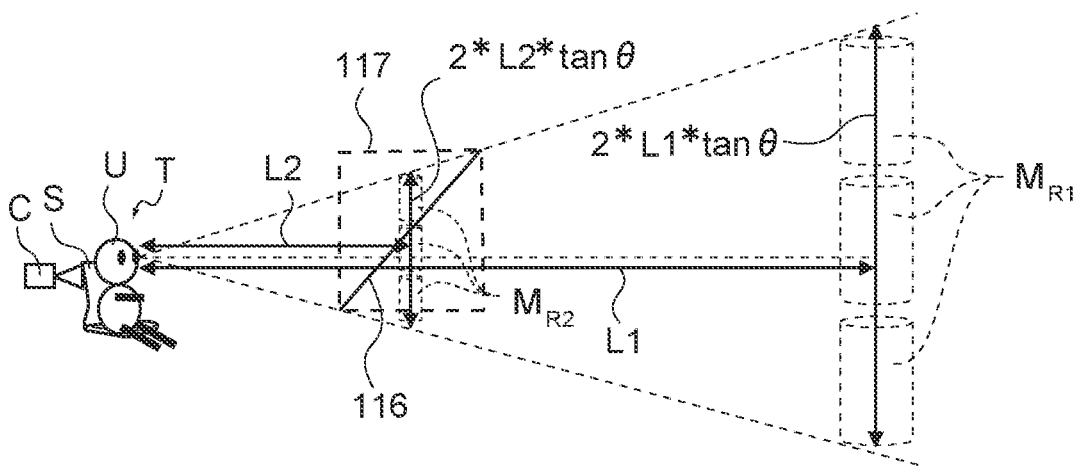

FIG. 13 is a schematic view showing a specific example of a change in position and size of the 3D model of interest by the 3D model control unit.

Figures 14A, 14B:
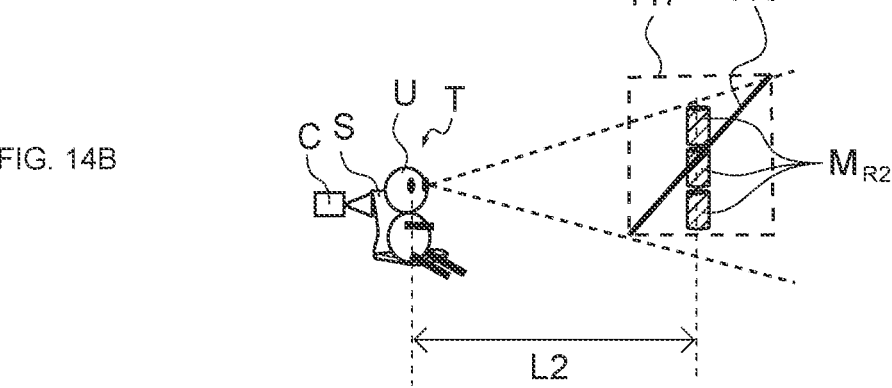

FIGS. 14A and 14B are schematic views showing a size reduction of the 3D model of interest by the 3D model control unit.

Figure 15:
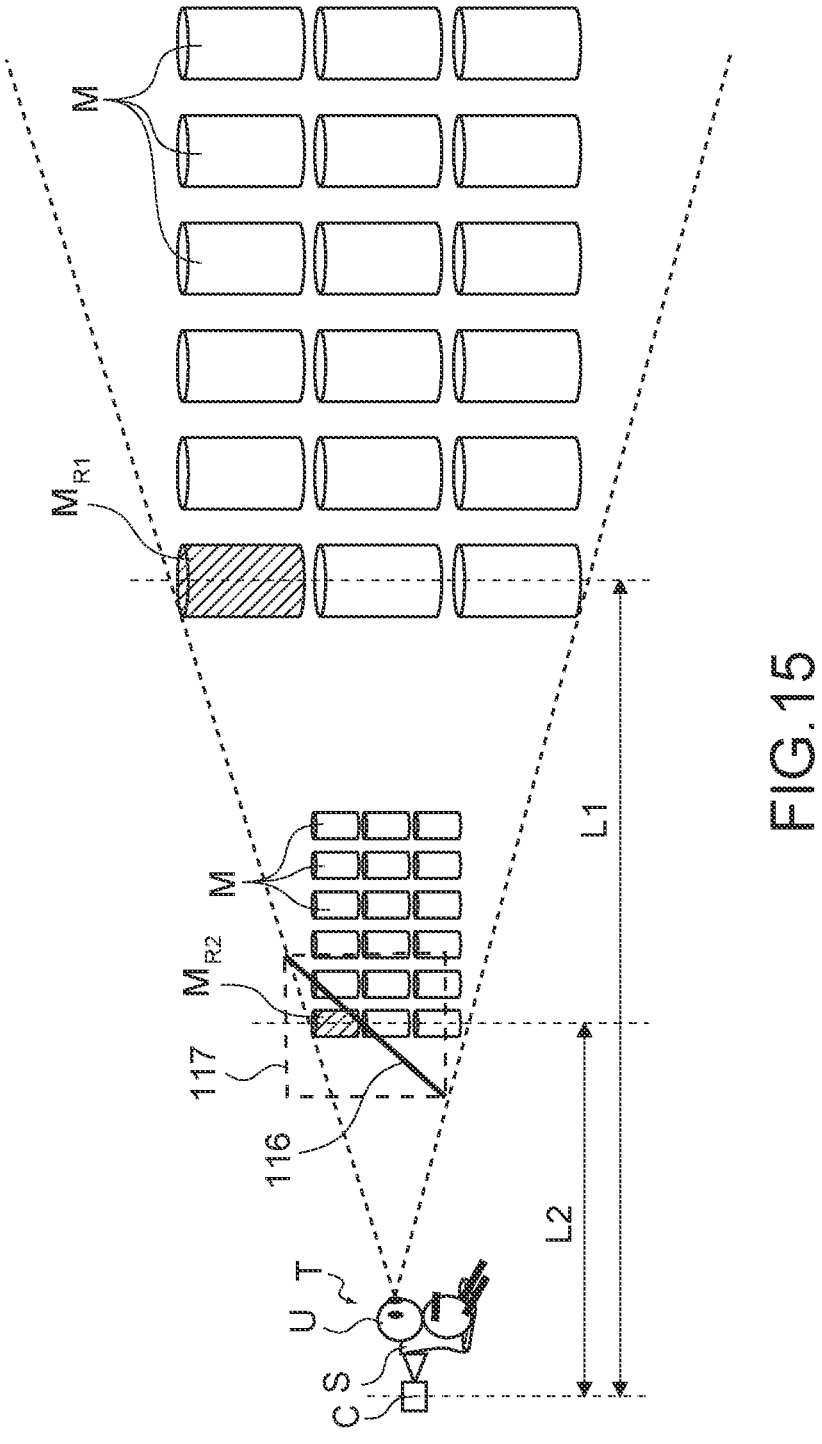

FIG. 15 is a schematic view showing a specific example of a change in position and size of a 3D model by the 3D model control unit.

Figure 16:
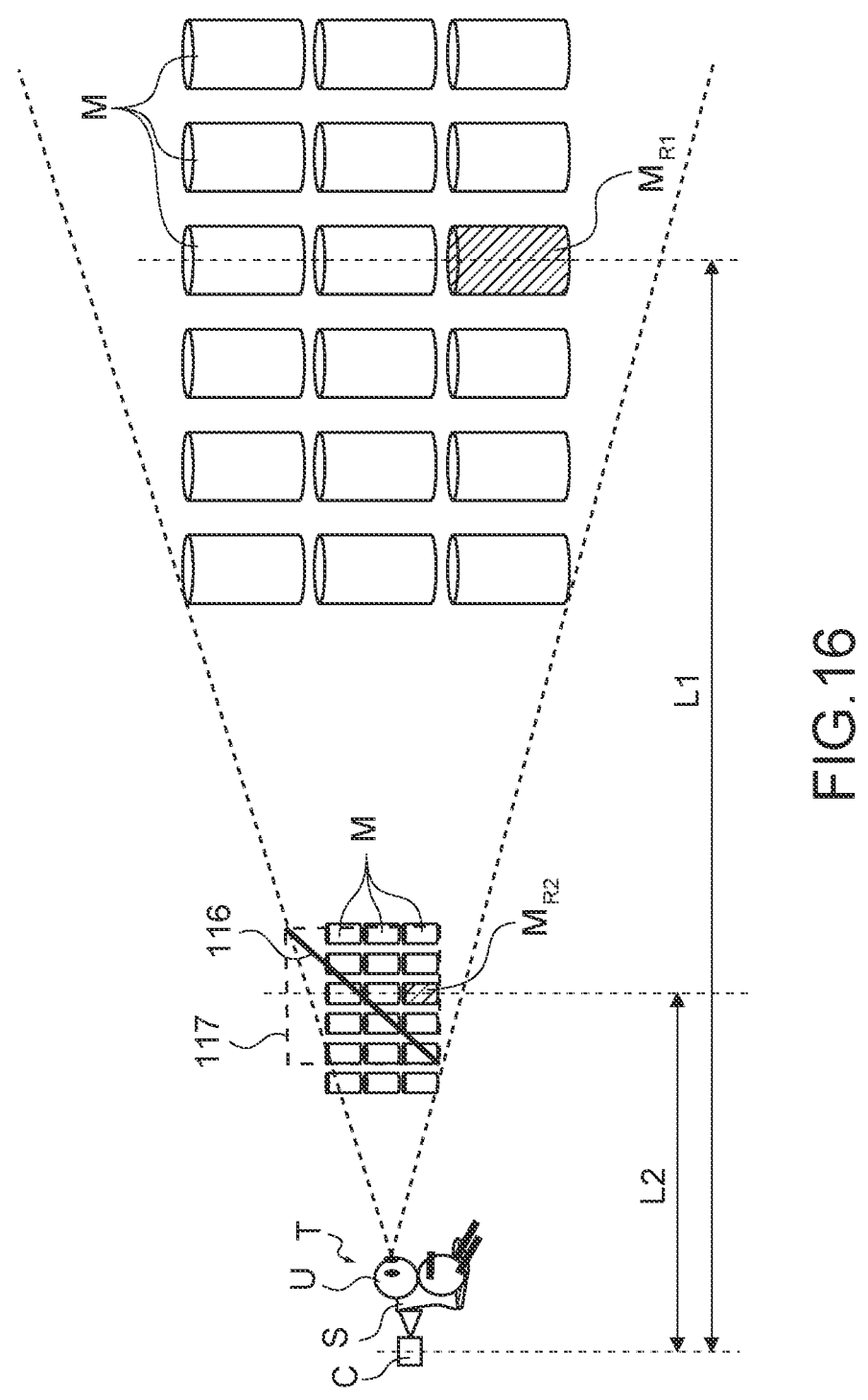

FIG. 16 is a schematic view showing a specific example of a change in position and size of a 3D model by the 3D model control unit.

Figure 17:
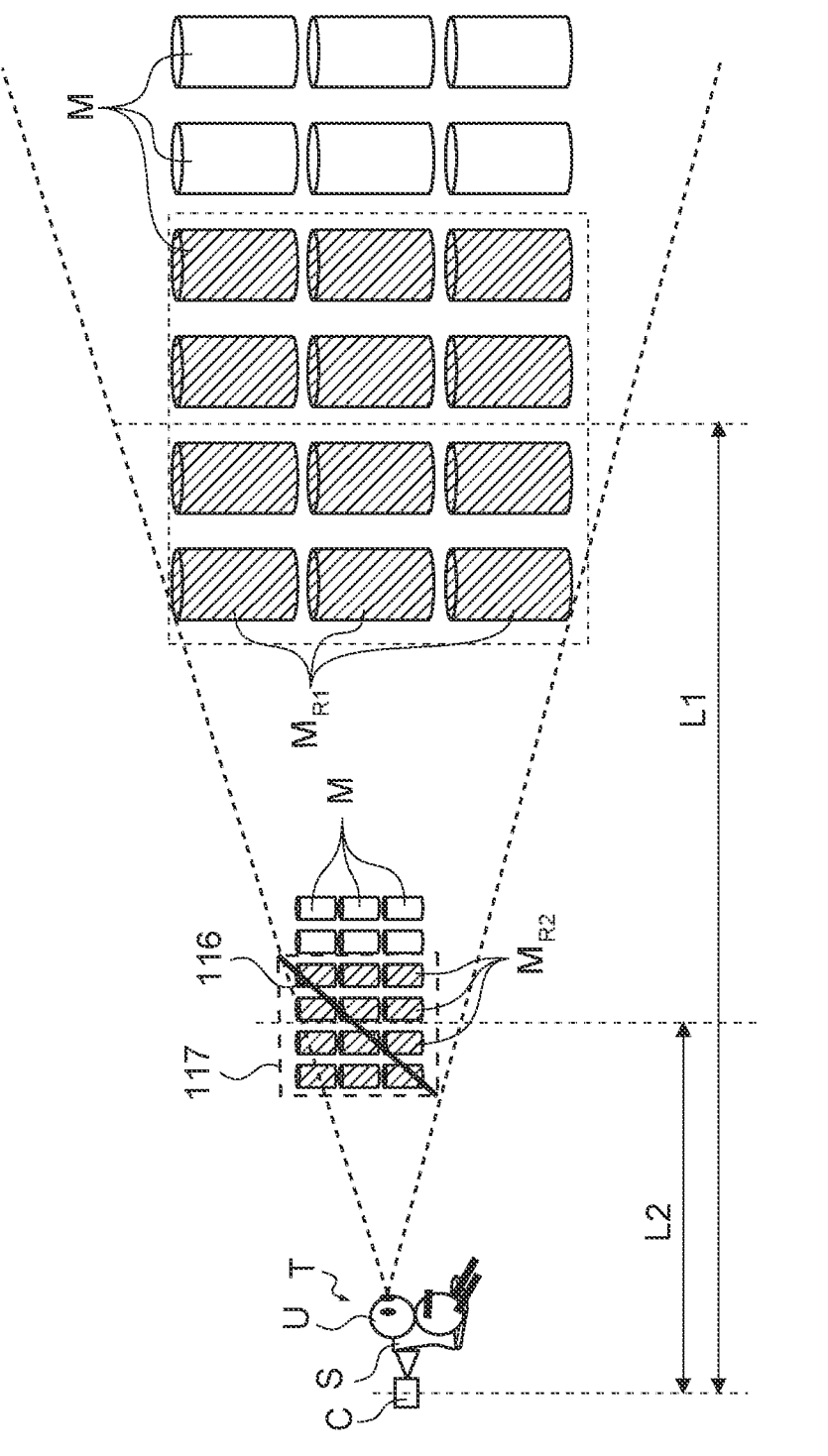

FIG. 17 is a schematic view showing a specific example of a change in position and size of a 3D model by the 3D model control unit.

Figure 18:
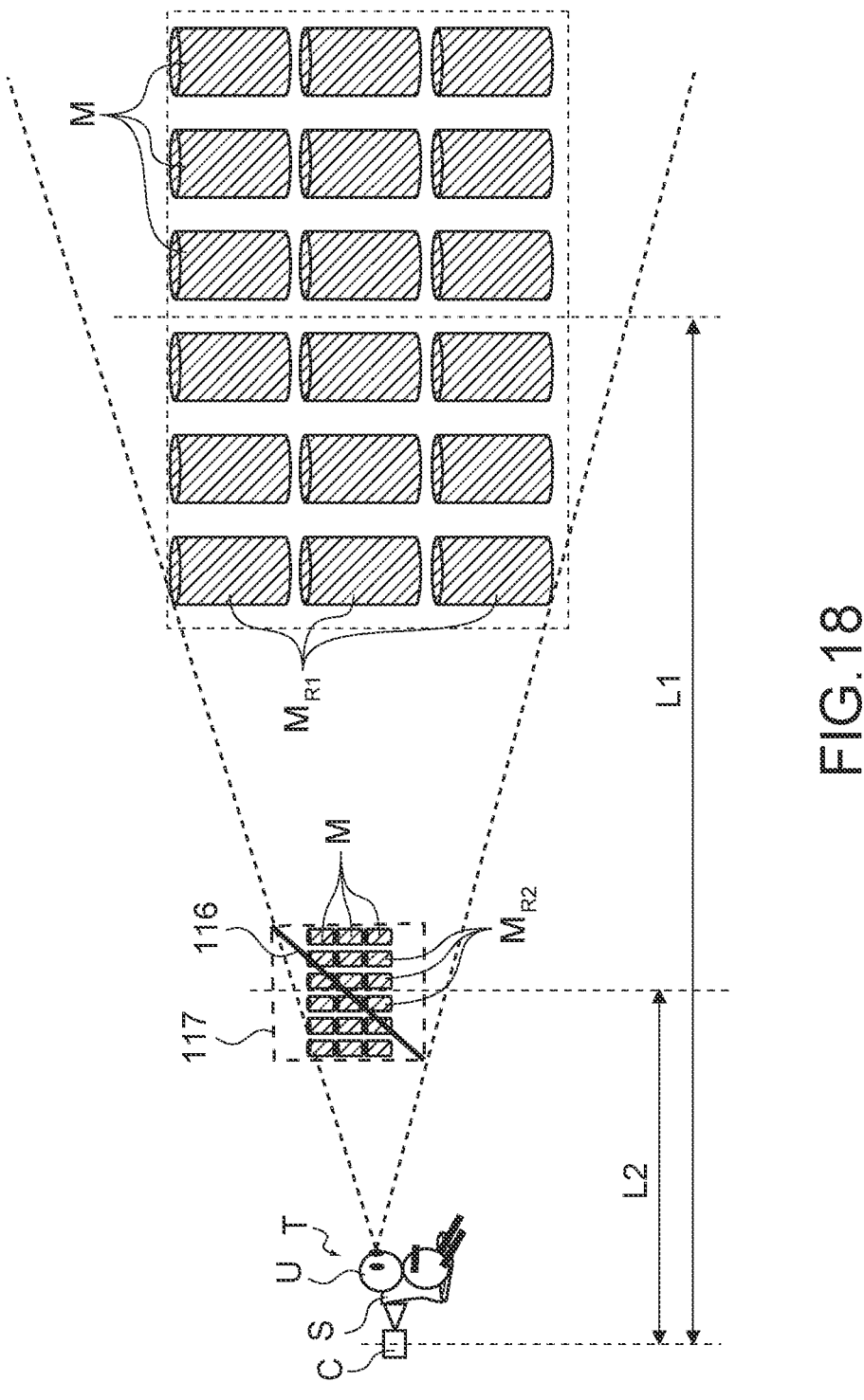

FIG. 18 is a schematic view showing a specific example of a change in position and size of a 3D model by the 3D model control unit.

Figure 19:
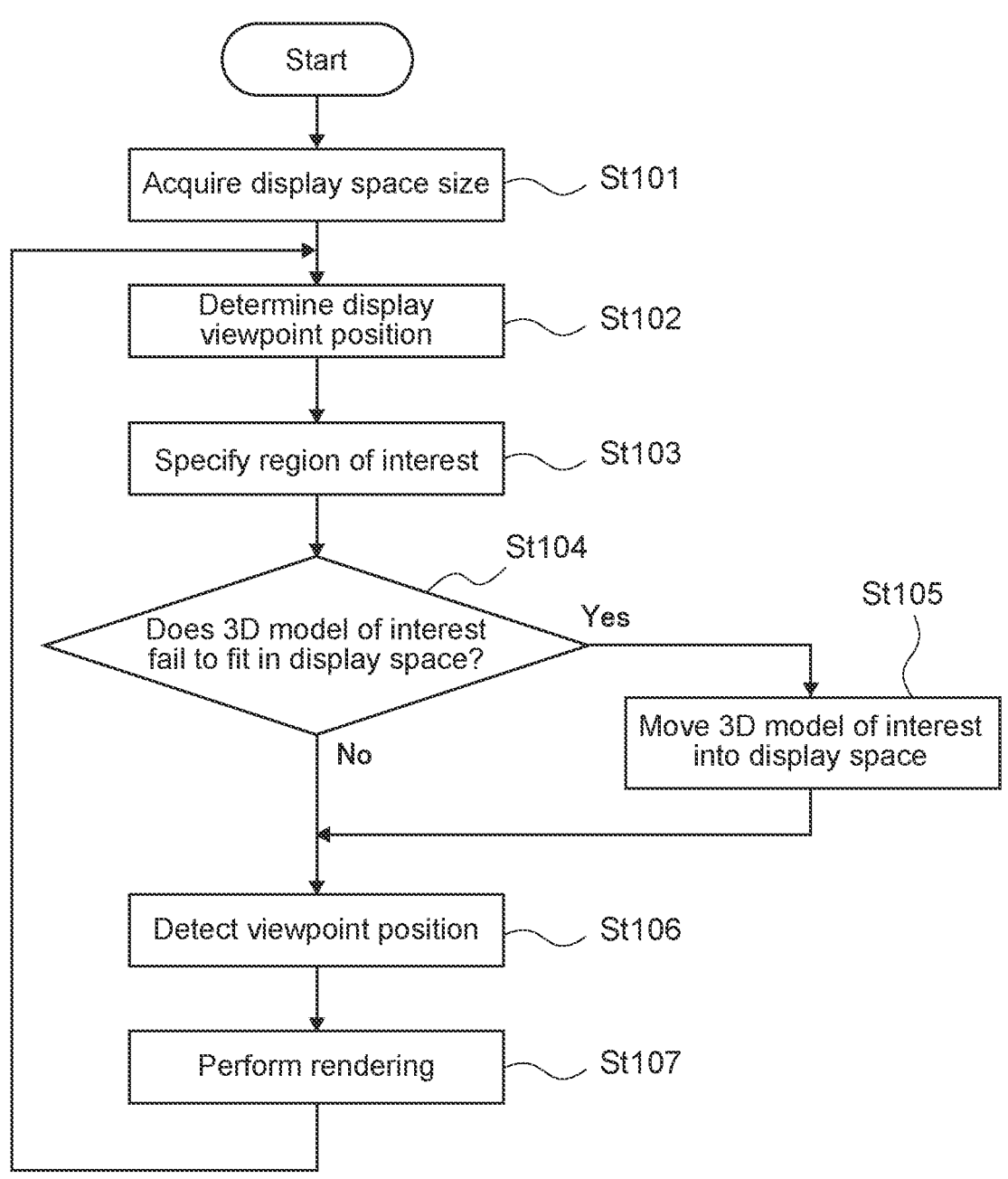

FIG. 19 is a flowchart showing an operation of the information processing apparatus.

Figure 20:
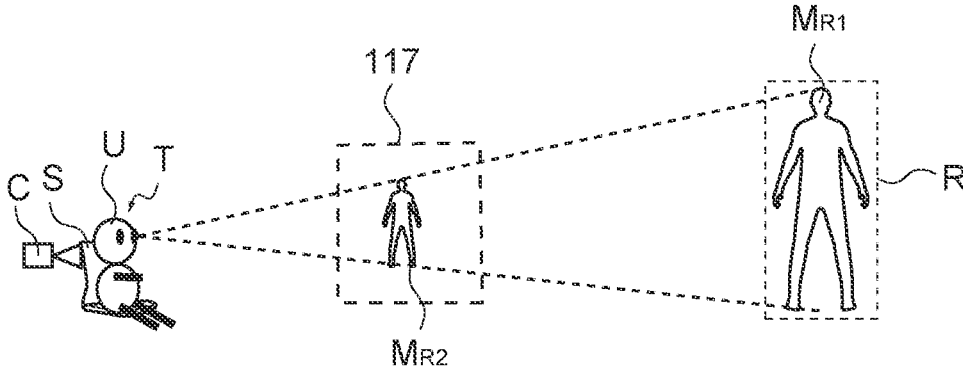

FIG. 20 is a schematic view showing a change in position and size of the 3D model of interest by the 3D model control unit.

Figure 21:
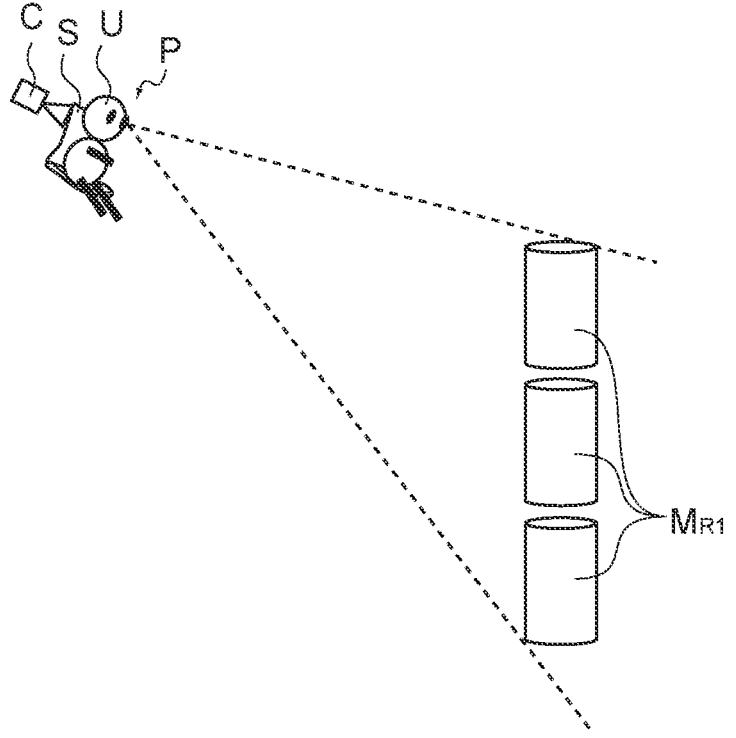

FIG. 21 is a schematic view showing a position relationship between a designated viewpoint position and a 3D model of interest.

Figure 22:
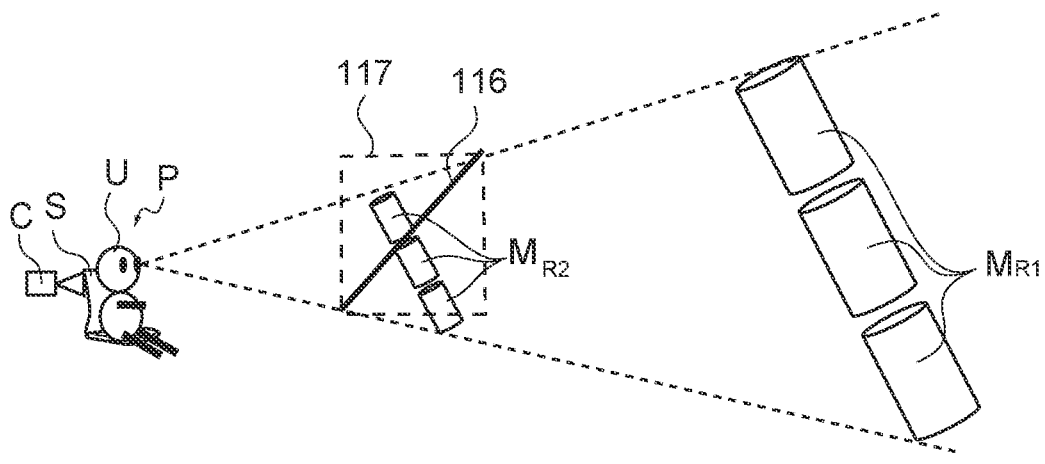

FIG. 22 is a schematic view showing a position relationship between a designated viewpoint position and a 3D model of interest.

Figure 23:
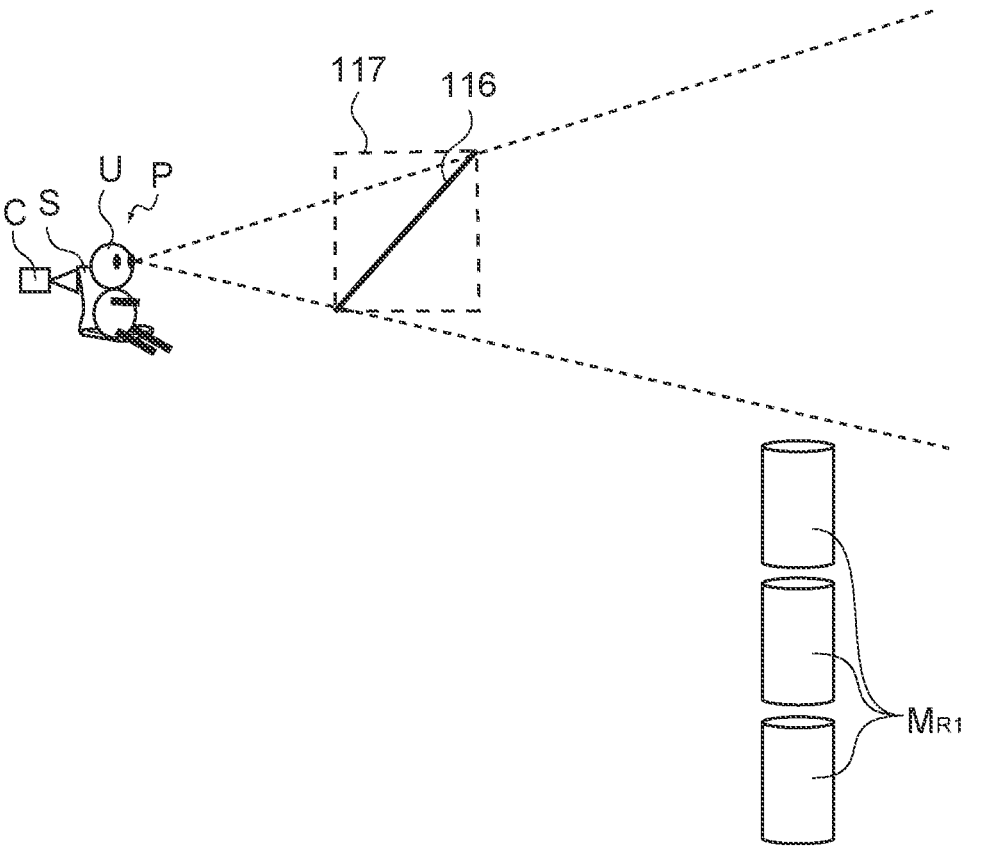

FIG. 23 is a schematic view showing a position relationship between a designated viewpoint position and a 3D model of interest.

Figure 24A:
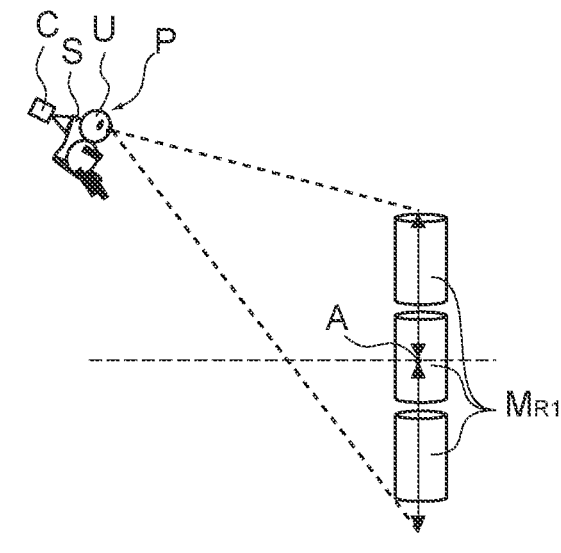
Figure 24B:
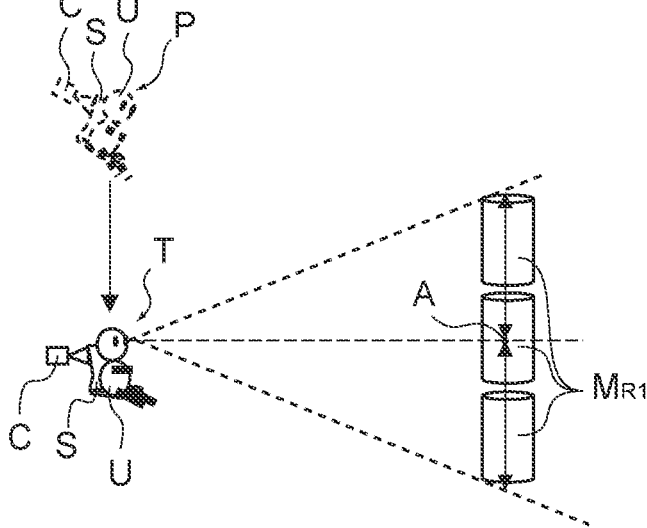
Figure 24C:
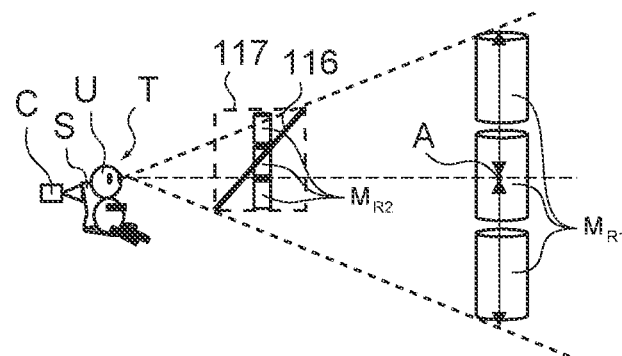

FIGS. 24A, 24B, and 24C are schematic views showing movement of a display viewpoint position with respect to a designated viewpoint position by the viewpoint position determining unit included in the information processing apparatus.

Figure 25:
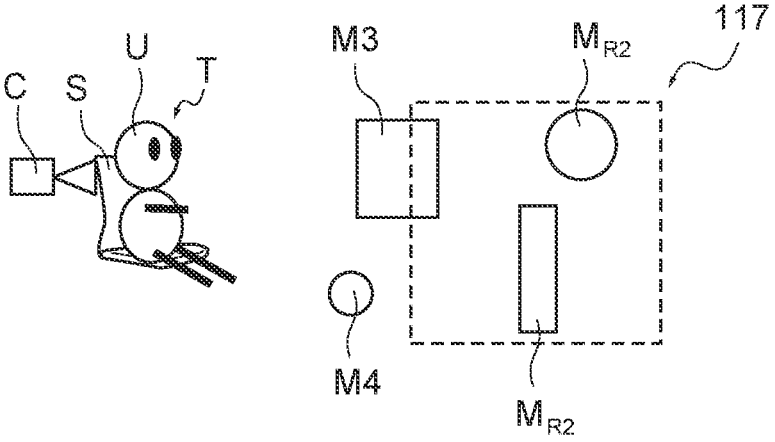

FIG. 25 is a schematic view showing generation of a 2D image by a display control unit included in the information processing apparatus.

Figure 26:
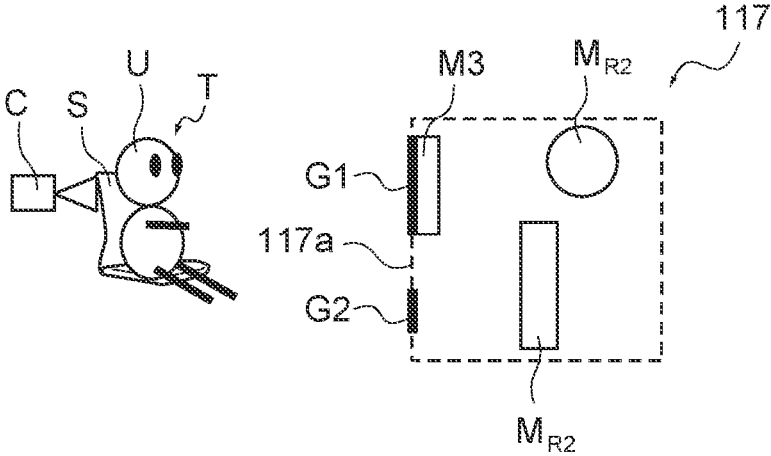

FIG. 26 is a schematic view showing generation of a 2D image by the display control unit.

Figure 27A:
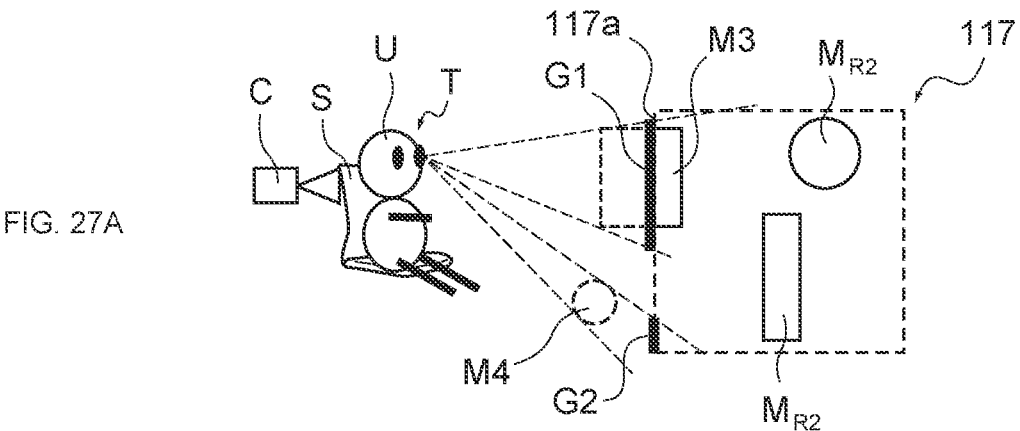
Figure 27B:
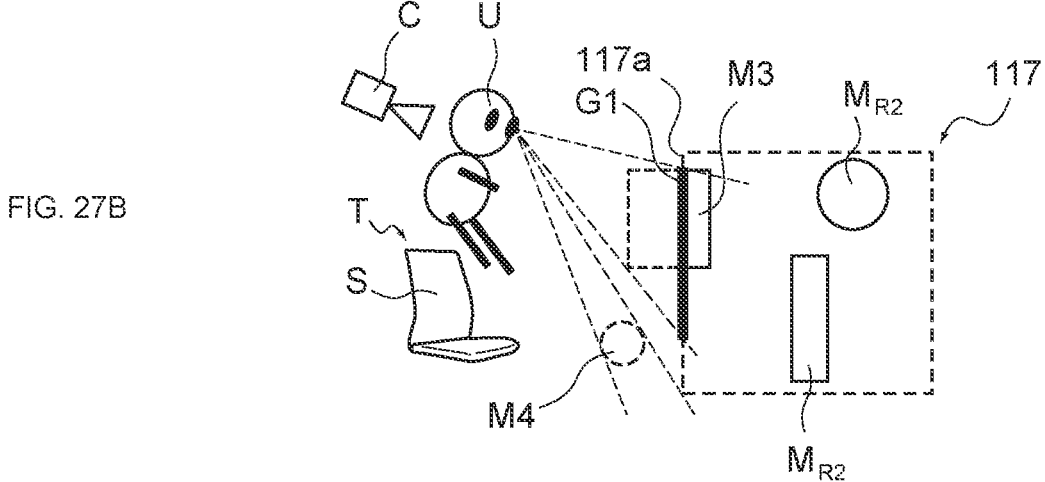

FIGS. 27A and 27B are schematic views showing generation of a 2D image by the display control unit.

Figure 28:
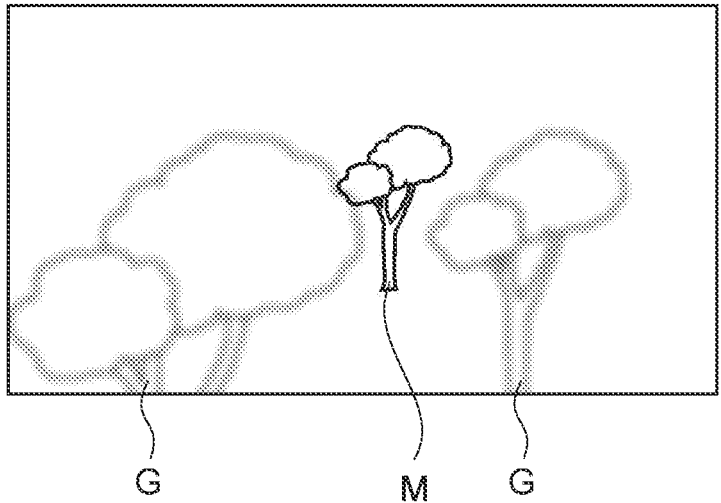

FIG. 28 is a schematic view showing blurring processing of a 2D image by the display control unit.

Figure 29A:
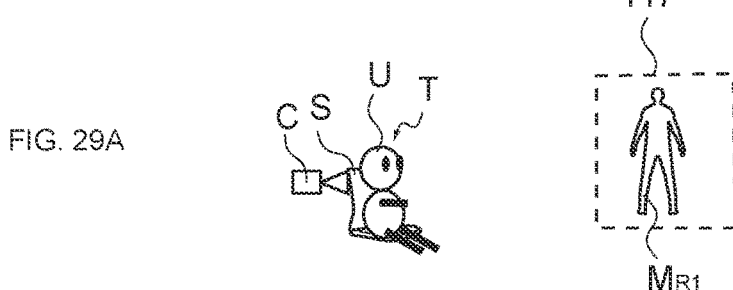
Figure 29B:
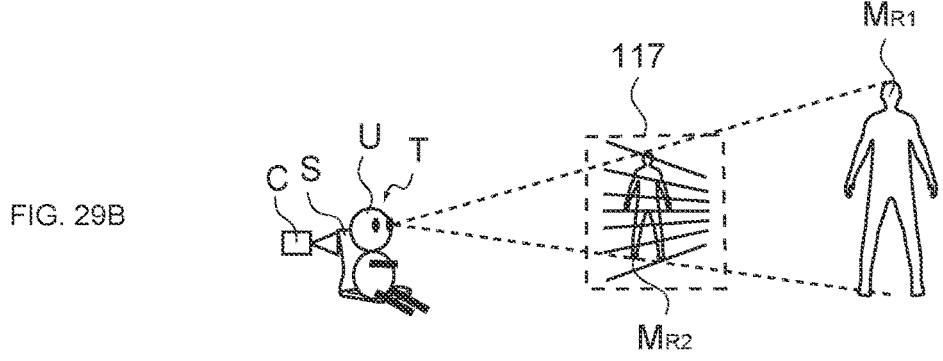
Figure 29C:
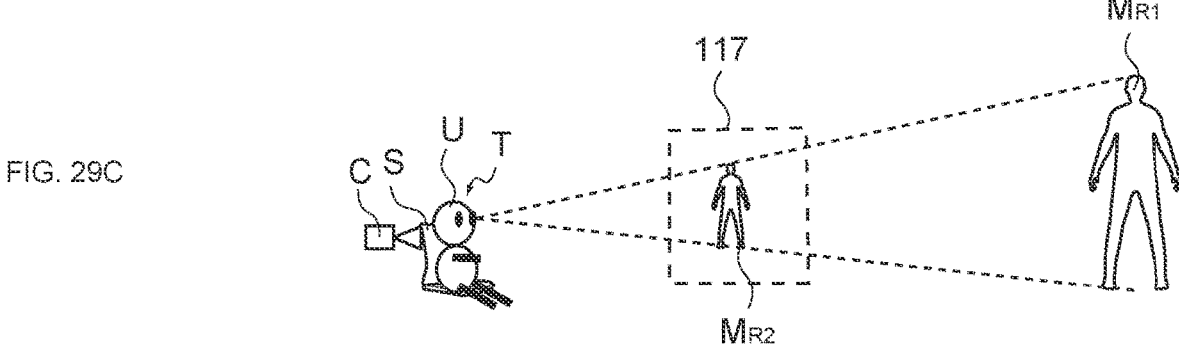

FIGS. 29A, 29B, and 29C are schematic views showing a supplementary indication by the display control unit.

Figure 30:
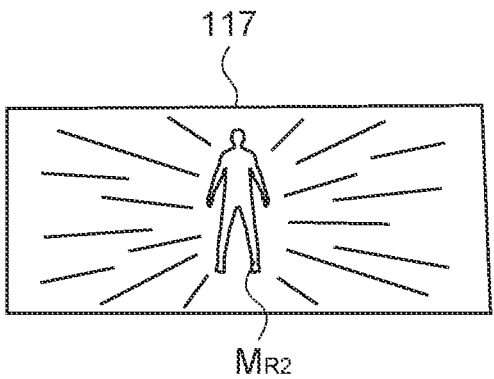

FIG. 30 is a schematic view showing a supplementary indication by the display control unit.

Figure 31A:
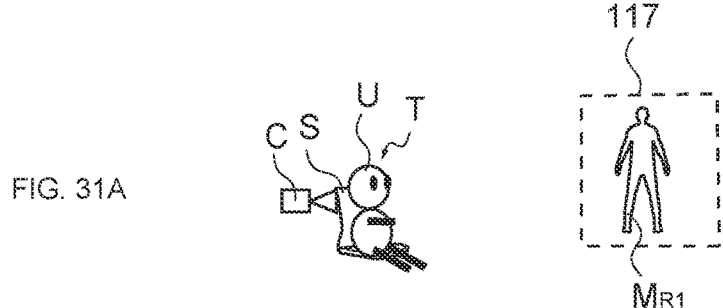
Figure 31B:
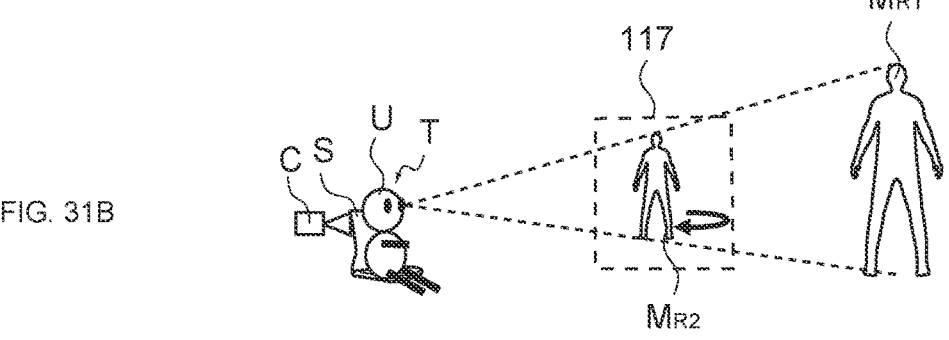
Figure 31C:
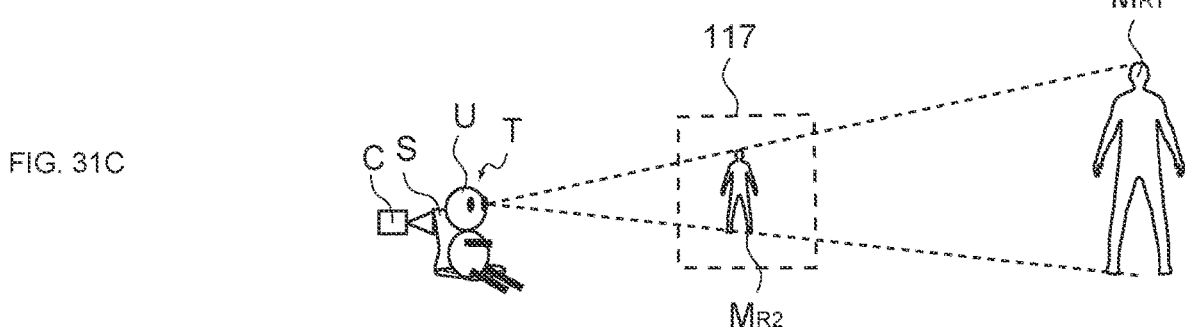

FIGS. 31A, 31B, and 31C are schematic views showing a supplementary indication by the display control unit.

Figure 32A:
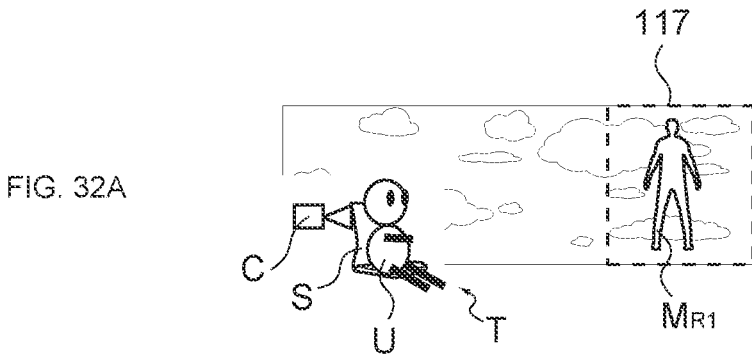
Figure 32B:
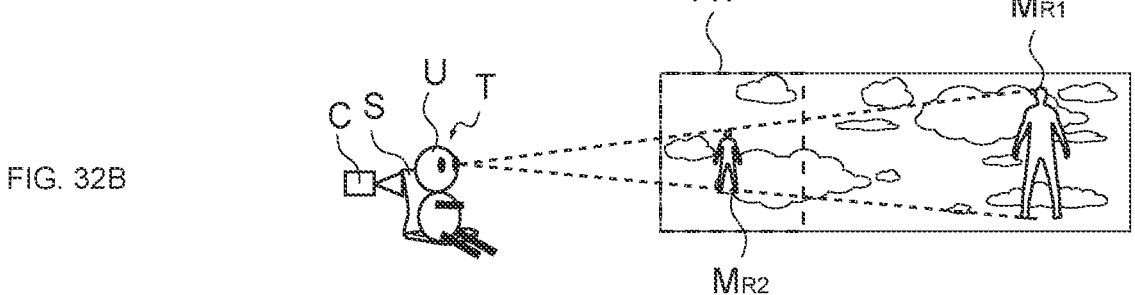

FIGS. 32A and 32B are schematic views showing a supplementary indication by the display control unit.

Figure 33A:
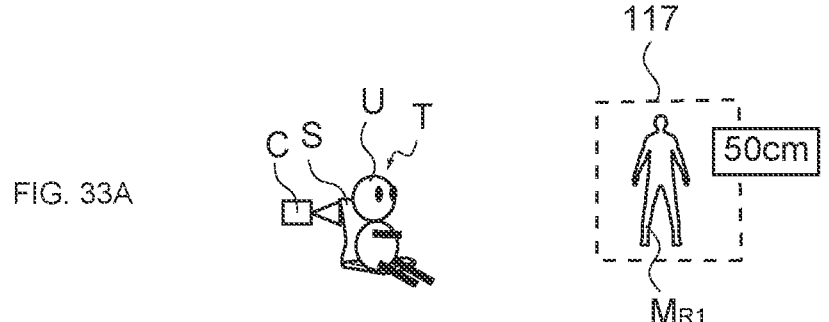
Figure 33B:
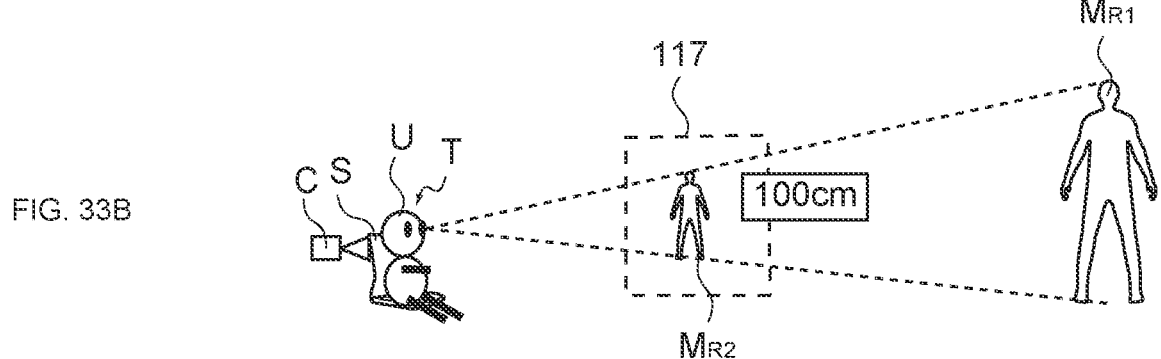

FIGS. 33A and 33B are schematic views showing a supplementary indication by the display control unit.

Figure 34:
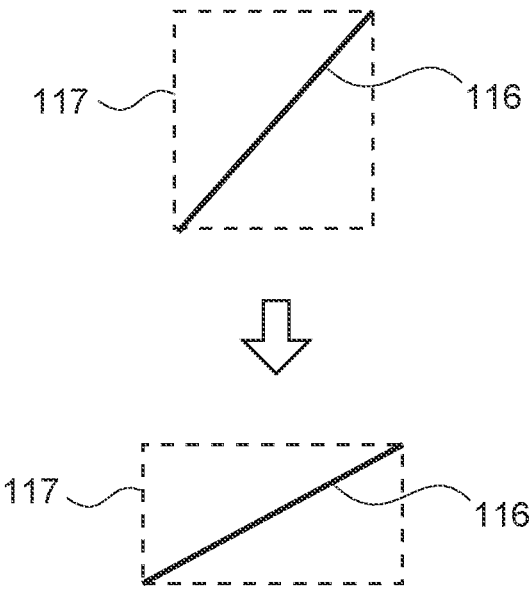

FIG. 34 is a schematic view showing a change in size of a display space of the spatial reproduction display.

Figure 35:
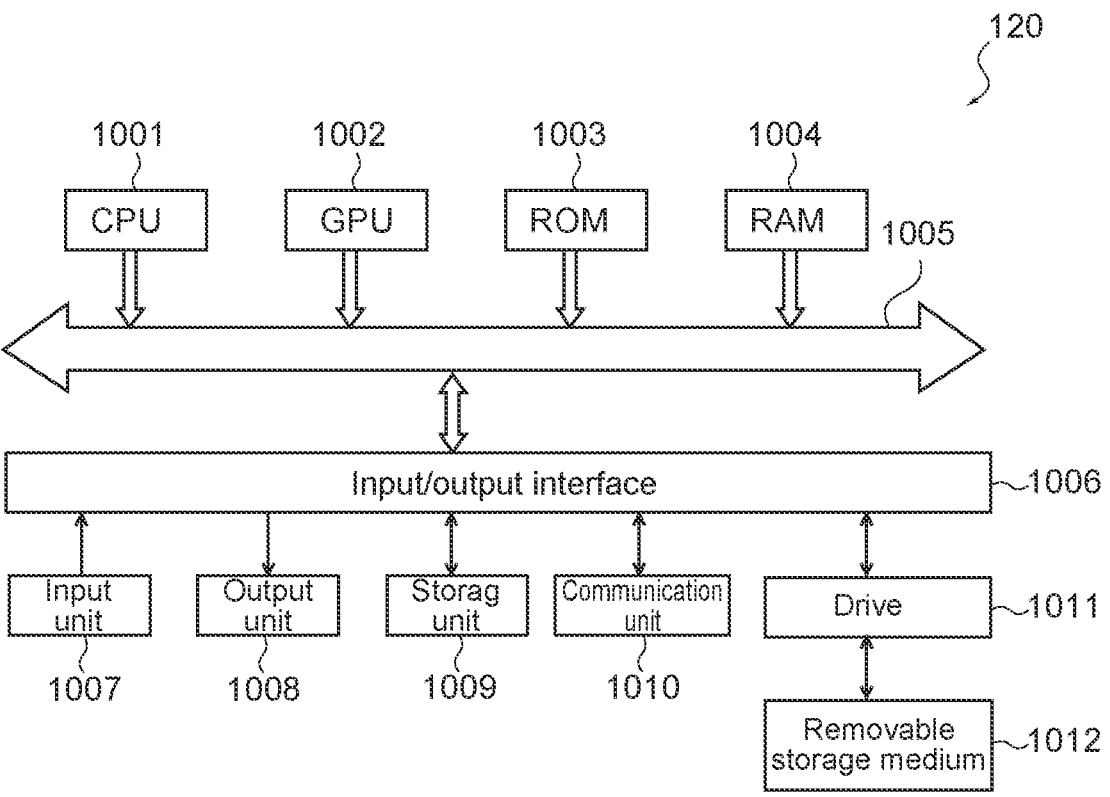

FIG. 35 is a block diagram showing a hardware configuration of the information processing apparatus.

MODE (S) FOR CARRYING OUT THE INVENTION

A spatial reproduction display system according to an embodiment of the present technology will be described. [Configuration of Spatial Reproduction Display System]

Figure 1:
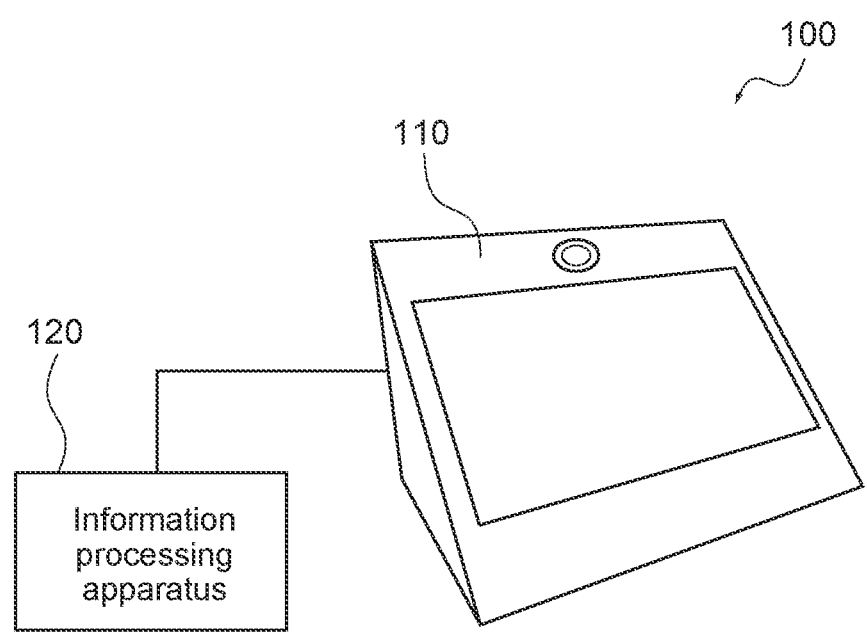
FIG. 1 is a schematic view of a spatial reproduction display system according to an embodiment of the present technology.

FIG. 1 is a schematic view of a spatial reproduction display system 100 according to this embodiment. As shown in the figure, the spatial reproduction display system 100 includes a spatial reproduction display 110 and an information processing apparatus 120. The spatial reproduction display 110 and the information processing apparatus 120 may be connected to each other via wired or wireless connection or may be connected to each other via a network. Further, the information processing apparatus 120 may be formed integrally with the spatial reproduction display 110. [Configuration of Spatial Reproduction Display]

Figure 2:
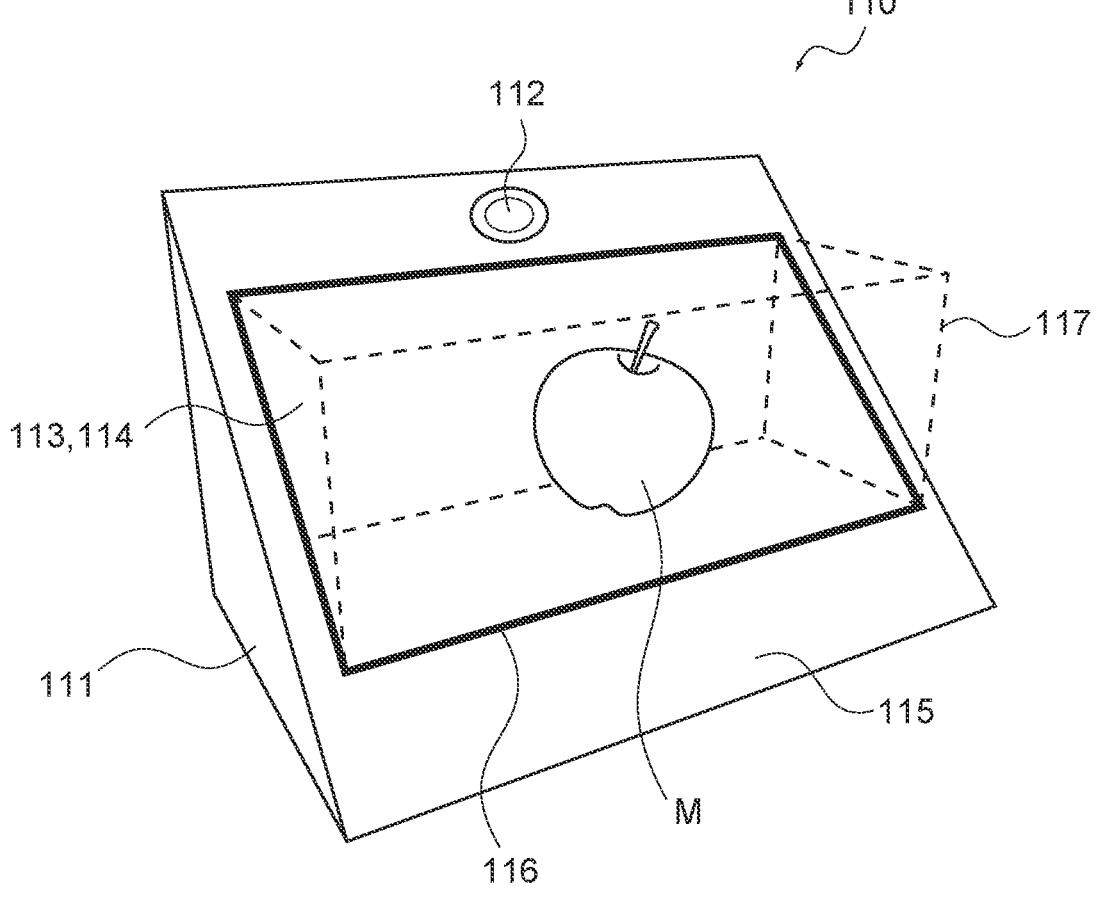
FIG. 2 is a schematic view of a spatial reproduction display included in the spatial reproduction display system.

FIG. 2 is a perspective view of the spatial reproduction display 110. The spatial reproduction display 110 is a display that stereoscopically displays a 3D model M. The spatial reproduction display 110 is, for example, a stationary apparatus that is placed on a table or the like to be used, and can stereoscopically display a 3D model M constituting video content or the like to a user who views the spatial reproduction display 110.

The spatial reproduction display 110 may be a light field display. The light field display is a display that dynamically generates right and left parallax images in accordance with a position of a viewpoint of a user. Those parallax images are displayed toward the right eye and the left eye of the user, so that stereoscopic-vision (stereo three-dimensional vision) display for the naked eyes is achieved.

Specifically, as shown in FIG. 2, the spatial reproduction display 110 includes a casing 111, a camera 112, a display panel 113, and a lenticular lens 114. The casing 111 is a casing that houses each part of the spatial reproduction display 110, and has an inclined surface 115. The inclined surface 115 is configured to be inclined with respect to a placement surface on which the spatial reproduction display 110 is placed. The camera 112 and the display panel 113 are disposed on the inclined surface 115.

The camera 112 is an imaging element that images the face of a user who views the display panel 113. The camera

112 is appropriately disposed at a position at which the face of the user can be imaged, for example. In FIG. 2, the camera 112 is disposed at a position, on the inclined surface 115, at the upper side of the center of the display panel 113. As the camera 112, for example, a digital camera including an image sensor such as a complementary metal-oxide semiconductor (CMOS) sensor or a charge coupled device (CCD) sensor is used. A specific configuration of the camera 112 is not limited. For example, a multi-lens camera such as a stereo camera may be used. Further, an infrared camera that emits infrared light and captures an infrared image, a ToF camera that functions as a ranging sensor, or the like may be used as the camera 112.

The display panel 113 is a display element that displays parallax images for stereoscopically displaying the 3D model M. The display panel 113 is, for example, a panel having a rectangular shape in plan view and is disposed on the inclined surface 115. In other words, the display panel 113 is disposed in an inclined state as viewed from the user. This allows the user to visually recognize the 3D model M even when the user views the display panel 113, for example, from the horizontal direction or the vertical direction.

As the display panel 113, for example, a display element such as a liquid crystal display (LCD), a plasma display panel (PDP), or an organic electro-luminescence (EL) panel can be used. A region of the display panel 113, in which parallax images are displayed, is a display region 116 of the spatial reproduction display 110. FIG. 2 schematically shows the display region 116 as a region indicated by a thick black line.

The lenticular lens 114 is a lens that is attached to a surface (display region 116) of the display panel 113 and that refracts light beams output from the display panel 113 in a specific direction only. The lenticular lens 114 has, for example, a structure in which elongated convex lenses are arranged to be adjacent to each other, and is disposed such that the extending direction of the convex lenses coincides with the up-down direction of the display panel 113. For example, a two-dimensional image including right and left parallax images that are divided into a strip shape in accordance with the lenticular lens 114 is displayed on the display panel 113. The two-dimensional image is appropriately configured, which makes it possible to display corresponding parallax images toward the right eye and the left eye of the user.

In the spatial reproduction display 110, stereoscopic display can be achieved by a lenticular lens system in which the lenticular lens 114 included in the display panel 113 controls an emission direction for each display pixel as described above. In addition, in the spatial reproduction display 110, a system for achieving stereoscopic display is not limited. For example, a parallax barrier method may be used, in which a shielding plate is provided for each set of display pixels to separate light beams incident on each eye. Further, a polarization method of displaying parallax images using polarized glasses or the like, a frame sequential method of switching and displaying parallax images for each frame using liquid crystal glasses or the like, or the like may be used.

The spatial reproduction display 110 can stereoscopically display at least one 3D model M, using the right and left parallax image displayed in the display region 116 of the display panel 113. In the following description, parallax images for the left eye and the right eye, which represent each 3D model M, will be referred to as a left-eye model image and a right-eye model image. The left-eye model image and the right-eye model image are, for example, a set of images obtained when a certain 3D model M is viewed from positions corresponding to the left eye and the right eye. Thus, in the display region 116, a pair of the left-eye model image and the right-eye model image is displayed as many as the number of 3D models M. As described above, the display region 116 is a region in which a pair of a left-eye model image and a right-eye model image, which are generated for each 3D model M so as to correspond to the left eye and the right eye of the user, is displayed.

Figure 3:
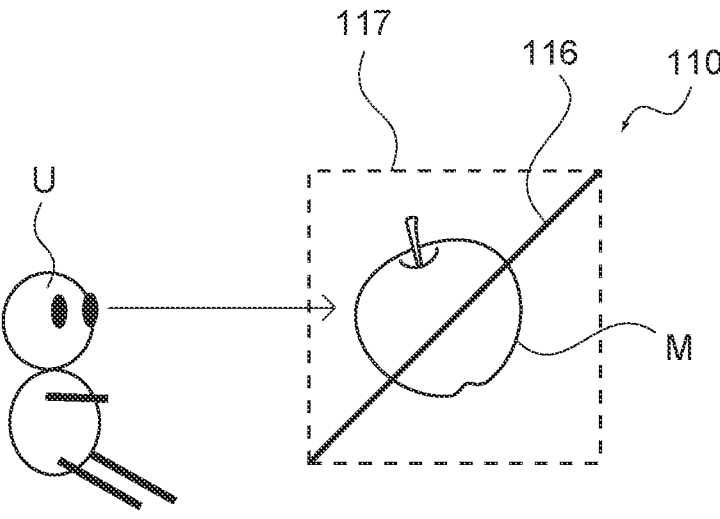
FIG. 3 is a schematic view of a 3D model displayed by the spatial reproduction display.

In the spatial reproduction display 110, a 3D model M is stereoscopically displayed in a space set in advance. Hereinafter, such a space will be referred to as a display space 117. FIG. 2 schematically shows a space corresponding to the display space 117 by a dotted line. FIG. 3 is a schematic view showing a 3D model M visually recognized by a user U. As shown in the figure, the user U who views the spatial reproduction display 110 visually recognizes the left-eye model image and the right-eye model image that are displayed in the display region 116, and can thus recognize the 3D model M as if the 3D model M exists on the near side and the far side of the display region 116 and really exists in the display space 117.

Further, in the spatial reproduction display 110, a viewpoint of the user U can be detected by the camera 112, and a left-eye model image and a right-eye model image can be generated according to a detection result. Thus, when the user U moves the viewpoint by moving the head, a direction of the 3D model M changes accordingly, and the user can recognize the 3D model M as if the user is actually viewing the 3D model M. Note that, in the spatial reproduction display 110, the left-eye model image and the right-eye model image can also be generated, without detecting the viewpoint, such that the 3D model M can be stereoscopically viewed when the display region 116 is visually recognized from the front.

As the display space 117, a space having a rectangular parallelepiped shape, in which the right and left short sides of the display region 116 are diagonal lines of the surfaces facing each other of the rectangular parallelepiped shape, can be used. Further, each surface of the display space 117 is set to be a surface parallel to or orthogonal to an arrangement surface on which the spatial reproduction display 110 is disposed. This makes it easier to recognize, for example, a front-back direction, an up-down direction, a bottom surface, and the like in the display space 117. Note that the shape of the display space 117 is not limited and can be discretionally set in accordance with, for example, a use application of the spatial reproduction display 110.

[Configuration of Information Processing Apparatus]

FIG. 4 is a block diagram showing a configuration of the information processing apparatus 120. As shown in the figure, the information processing apparatus 120 includes a 3D content retaining unit 121, a viewpoint position determining unit 122, a region-of-interest specifying unit 123, a display space acquiring unit 124, a change processing execution determining unit 125, a 3D model control unit 126, a user viewpoint detecting unit 127, and a rendering unit 128. Note that the 3D model control unit 126 and the rendering unit 128 will be collectively referred to as a display control unit 129. Those constituent elements of the information processing apparatus 120 are functional constituent elements achieved by cooperation of hardware and software.

The 3D content retaining unit 121 retains 3D content. The 3D content is content including at least information regarding a 3D model M, and the information regarding a 3D model M includes the shape and arrangement of the 3D model M. Further, the 3D content includes a "designated viewpoint position". FIG. 5 is a schematic view showing a 3D model M and a designated viewpoint position P.

FIG. 5 shows a 3D model M. A creator of 3D content can give a camerawork to a 3D model M in order to allow the user to visually recognize the 3D model M from an intended viewpoint position. The camerawork means a function in which the designated viewpoint position P, which is designated by an intent of the content creator, automatically moves to change a viewing angle of the 3D model M.

In FIG. 5, the designated viewpoint position P is represented by a seat S, and a 3D model M imaged by a camera C fixed to the seat S is a 3D model M viewed from the designated viewpoint position P. When the 3D model M viewed from the designated viewpoint position P is displayed by the spatial reproduction display 110, the user can visually recognize a change in angle of the 3D model M viewed from the designated viewpoint position P along with the movement of the designated viewpoint position P. Further, the user U himself/herself can also change the viewing angle of the 3D model M slightly by moving the head on the basis of the designated viewpoint position P.

FIGS. 6A and 6B are schematic views showing a change of the 3D model M in accordance with the designated viewpoint position P. When the designated viewpoint position P is a viewpoint position P1 at a certain distance from the 3D model M as shown in FIG. 6A, the user U visually recognizes a 3D model M1 as shown in FIG. 6B on the spatial reproduction display 110. When the designated viewpoint position P is a viewpoint position P2 separated away from the 3D model M relative to the viewpoint position P1 as shown in FIG. 6A, the user U visually recognizes a 3D model M2 as shown in FIG. 6B on the spatial reproduction display 110. The 3D model M2 is displayed to be smaller than the 3D model M1 and to have a small parallax on the spatial reproduction display 110, and thus the user U can recognize that the 3D model M2 is located at a position farther than the 3D model M1.

The viewpoint position determining unit 122 determines a "display viewpoint position". The display viewpoint position is a viewpoint position with respect to the 3D model M, and the 3D model M viewed from the display viewpoint position is displayed on the spatial reproduction display 110. FIGS. 7A and 7B are schematic views showing a display viewpoint position T. The viewpoint position determining unit 122 can determine a display viewpoint position T on the basis of the designated viewpoint position P acquired from the 3D content retaining unit 121.

Specifically, the viewpoint position determining unit 122 can set the designated viewpoint position P as a display viewpoint position T as shown in FIG. 7A. Further, the viewpoint position determining unit 122 is also capable of setting a viewpoint position different from the designated viewpoint position P as a display viewpoint position T as shown in FIG. 7B. The viewpoint position determining unit 122 may move the display viewpoint position T in accordance with an operation input by the user or the elapse of time. The viewpoint position determining unit 122 supplies the determined display viewpoint position T to the change processing execution determining unit 125 and the 3D model control unit 126.

The region-of-interest specifying unit 123 specifies a "region of interest". The region of interest is a region that includes at least a part of the 3D model M and is desired to be focused on by the user. FIGS. 8 to 10 are schematic views each showing a region of interest R. Note that, in the following figures, the 3D models M are represented by a plurality of cylinders. As shown in FIG. 8, the region of interest R can be a region including one 3D model M. Hereinafter, among the 3D models M, a 3D model M included in the region of interest R is represented by a 3D model of interest $M_R$ and is hatched. As shown in FIG. 9, the region of interest R may include a plurality of 3D models M. As shown in FIG. 10, the region of interest R may include all the 3D models M.

The region of interest R can be designated by the creator of the 3D content and retained in the 3D content retaining unit 121. The region-of-interest specifying unit 123 can acquire the region of interest R from the 3D content retaining unit 121. The region-of-interest specifying unit 123 supplies the specified region of interest R to the change processing execution determining unit 125 and the 3D model control unit 126.

The display space acquiring unit 124 acquires the size of the display space 117 (see FIG. 2) (hereinafter, referred to as display space size) in the spatial reproduction display 110. The display space size is an actual size of the display space 117 defined by a size and an inclination angle of the display region 116. The display space acquiring unit 124 acquires the display space size from a registry or the like of the spatial reproduction display 110, and supplies the acquired display space size to the change processing execution determining unit 125 and the 3D model control unit 126.

The change processing execution determining unit 125 determines whether to execute change processing by the 3D model control unit 126. The change processing execution determining unit 125 determines whether to execute the change processing on the basis of the display viewpoint position T, the region of interest R, and the size of the display space 117. Specifically, the change processing execution determining unit 125 can determine whether or not the whole of the 3D model of interest $M_R$ fits in the display space 117 when the 3D model of interest $M_R$ is viewed from the display viewpoint position T.

FIGS. 11A, 11B, and 11C are schematic views showing a determination method by the change processing execution determining unit 125. FIG. 11A shows a case where the 3D models of interest MR fit in the display space 117. FIGS. 11B and 11C show cases where the 3D models of interest MR do not fit in the display space 117. If the 3D models M fit in the display space 117 as shown in FIG. 11A, the change processing execution determining unit 125 can determine that "the change processing is not to be performed". Further, if the 3D models M do not fit in the display space 117 as shown in FIGS. 11B and 11C, the change processing execution determining unit 125 can determine that "the change processing is to be performed". The change processing execution determining unit 125 supplies a determination result to the 3D model control unit 126.

The 3D model control unit 126 changes the position of the 3D model of interest $M_R$ with respect to the display viewpoint position T into a position within the display space 117 on the basis of the display viewpoint position T, the region of interest R, and the display space 117. In addition, the 3D model control unit 126 changes the size of the 3D model of interest $M_R$. Hereinafter, a 3D model of interest $M_R$ before its position and size are changed will be referred to as a 3D model of interest $M_{R1}$, and a 3D model of interest $M_R$ after its position and size are changed will be referred to as a 3D model of interest $M_{R2}$.

FIGS. 12A and 12B are schematic views showing a change in position and size of the 3D model of interest MR. FIG. 12A shows a state in which the 3D models of interest MR1 are located outside the display space 117, and a distance from the display viewpoint position T to the 3D models of interest MR1 is represented by a distance L1. FIG. 12B shows a state in which the 3D models of interest MR2 are located inside the display space 117, and a distance from the display viewpoint position T to the 3D models of interest MR2 is represented by a distance L2. Note that the distance from the display viewpoint position T to the 3D models of interest MR can be a distance from the display viewpoint position T to the center of gravity of the 3D models of interest MR.

The 3D model control unit 126 reduces the distance from the display viewpoint position T to the 3D models of interest MR at a first ratio to change the position of the 3D models of interest MR into a position within the display space 117, and reduces the size of the 3D models of interest MR at a second ratio. The second ratio can be the same ratio as the first ratio. Specifically, the 3D model control unit 126 reduces the distance from the display viewpoint position T to the 3D models of interest MR from the distance L1 to the distance L2, and changes the position of the 3D models of interest MR into a position within the display space 117 as shown in FIG. 12B. In addition, the 3D model control unit 126 reduces the size of the 3D models of interest MR1 at a ratio (L2/L1) to obtain 3D models of interest MR2. Thus, both the first ratio and the second ratio are the ratio (L2/L1).

FIG. 13 is a schematic view showing a specific example of a method of changing the size of the 3D model of interest $M_R$. As shown in the figure, when the distance from the display viewpoint position T to the 3D models of interest $M_{R1}$ is the distance L1, the size of the 3D models of interest $M_{R1}$ is represented by "2*L1*tan θ". The 3D model control unit 126 can change the size of the 3D models of interest $M_{R2}$ into "2*L2*tan θ", which is obtained by multiplying "2*L1*tan θ" by the ratio (L2/L1).

Normally, the spatial reproduction display 110 has an optimal viewing distance and an optimal viewing angle that are recommended by a manufacturer of the apparatus. The distance L2 can be determined as a fixed value on the basis of the viewing distance. Further, it can be assumed that the viewing angle is basically the front of the apparatus. As described above, the 3D model control unit 126 can change the position and size of the 3D models of interest $M_R$.

In addition, the 3D model control unit 126 can also calculate the position and size of the 3D models of interest $M_{R2}$ by other calculation methods using the display viewpoint position T, the region of interest R, and the size of the display space 117. Specifically, the 3D model control unit 126 can set the second ratio to a ratio at which the whole of the 3D models of interest $M_{R2}$ fits in the display space 117.

FIGS. 14A and 14B are schematic views showing an example of the calculation method. As shown in FIG. 14A, there is a case where even if the 3D models of interest MR2 are moved to the position at the distance L2 and reduced in size at the ratio (L2/L1), the whole of the 3D models of interest MR2 does not fit in the display space 117. In this case, the 3D model control unit 126 reduces the size of the 3D models of interest MR2 at a ratio at which the whole of the 3D models of interest MR2 fits in the display space 117, while keeping the distance from the display viewpoint position T to the 3D models of interest MR2 as the distance L2. Thus, in this case, the first ratio is the ratio (L2/L1), and the second ratio is a ratio smaller than the ratio (L2/L1).

In addition, the 3D model control unit 126 can change the position and size of a 3D model M other than the 3D model of interest $M_R$ in the same manner as the 3D model of interest $M_R$. In other words, the 3D model control unit 126 can reduce the distance from the display viewpoint position T to the 3D model M at the first ratio and can reduce the size of the 3D model M at the second ratio. Note that the distance from the display viewpoint position T to the 3D model M can be a distance from the display viewpoint position T to the center of gravity of the 3D model M.

FIGS. 15 to 18 are schematic views each showing a change in position and size of the 3D models M by the 3D model control unit 126. FIG. 15 shows an example in which one of the 3D models M is a 3D model of interest $M_R$. As shown in the figure, the 3D model control unit 126 calculates a ratio of a distance from the display viewpoint position T to the 3D model of interest $M_R$ such that a 3D model of interest $M_{R2}$ is located within the display space 117, and reduces the size of the 3D models M at the ratio.

FIG. 16 is a schematic view showing another example of changing the position and the size of the 3D models M by the 3D model control unit 126. As shown in the figure, one of the 3D models M is a 3D model of interest $M_R$, and FIG. 16 is different from FIG. 15 in the position of the 3D model of interest $M_R$. As shown in the figure, the 3D model control unit 126 calculates a ratio of a distance from the display viewpoint position T to the 3D model of interest $M_R$ such that a 3D model of interest $M_{R2}$ is located within the display space 117, and reduces the size of the 3D models M at the ratio. The position of the 3D model of interest $M_R$ is different from that of FIG. 15, and thus the mode of changing the position and size of the 3D models M is also different from that of FIG. 15.

FIG. 17 is a schematic view showing another example of changing the position and the size of the 3D models M by the 3D model control unit 126. As shown in the figure, if a plurality of 3D models M are 3D models of interest $M_R$, the 3D model control unit 126 calculates a ratio of a distance from the display viewpoint position T to the 3D models of interest $M_R$ such that 3D models of interest $M_{R2}$ are located within the display space 117, and reduces the size of the 3D models M at the ratio. If the whole of the 3D models of interest $M_R$ does not fit in the display space 117 after the size reduction, the 3D model control unit 126 further reduces the size of the 3D models at a ratio at which the whole of the 3D models of interest $M_R$ fits in the display space 117.

FIG. 18 is a schematic view showing another example of changing the position and the size of the 3D models M by the 3D model control unit 126. As shown in the figure, if all the 3D models M are 3D models of interest $M_R$, the 3D model control unit 126 calculates a ratio of a distance from the display viewpoint position T to the 3D models of interest $M_R$ such that 3D models of interest $M_{R2}$ are located within the display space 117, and reduces the size of the 3D models M at the ratio. If the whole of the 3D models of interest $M_R$ does not fit in the display space 117 after the size reduction, the 3D model control unit 126 further reduces the size of the 3D models at a ratio at which the whole of the 3D models of interest $M_R$ fits in the display space 117.

As described above, the 3D model control unit 126 changes the position of the 3D model of interest $M_R$ with respect to the display viewpoint position T to a position within the display space 117 and also changes the size of the 3D model of interest $M_R$. Further, the 3D model control unit 126 can change the position and size of a 3D model M other than the 3D model of interest $M_R$ in the same manner as the 3D model of interest $M_R$. The 3D model control unit 126 supplies a result of the change processing of the 3D model M, that is, the changed position and size of the 3D model M, to the rendering unit 128.

The user viewpoint detecting unit 127 detects the viewpoint of the user U. The user viewpoint detecting unit 127 can perform image processing on an image captured by the camera 112 and detect the viewpoint of the user U in real time. The user viewpoint detecting unit 127 supplies a result of the viewpoint detection to the rendering unit 128.

The rendering unit 128 renders the 3D model M and generates a left-eye model image and a right-eye model image. The rendering unit 128 renders the 3D model M after subjected to the change processing, on the basis of a result of the change processing of the 3D model M, which is supplied from the 3D model control unit 126. At that time, the rendering unit 128 can perform rendering by reflecting the result of the viewpoint detection, which is supplied from the user viewpoint detecting unit 127, and can change a direction of the 3D model in accordance with the viewpoint position of the user. The rendering unit 128 supplies the generated left-eye model image and right-eye model image to the display panel 113 and causes the display panel 113 to display those images.

The information processing apparatus 120 has the configuration described above. Note that the configuration of the information processing apparatus 120 is not limited to the configuration described above, and may be the following configuration.

In the above description, the region-of-interest specifying unit 123 acquires the region of interest R designated by the 3D content retaining unit 121, but the region-of-interest specifying unit 123 may specify the region of interest R on the basis of the result of the user viewpoint detection. Specifically, the region-of-interest specifying unit 123 can acquire the result of the viewpoint detection from the user viewpoint detecting unit 127 and can set a region that the user is gazing at as the region of interest R.

Further, the region-of-interest specifying unit 123 may acquire a region of interest, which is set by a plurality of users who views the same 3D content, from cloud or the like and may specify a region of interest R on the basis of the acquired region of interest. Thus, the region of interest R reflects the intentions of the plurality of users. In addition, the region-of-interest specifying unit 123 may specify a region of interest R in accordance with the arrangement of the 3D models M, such as setting a region, in which the 3D models M are concentrated, as a region of interest R.

Further, the rendering unit 128 performs rendering by reflecting the result of the viewpoint detection, which is supplied from the user viewpoint detecting unit 127, but the rendering unit 128 may perform rendering on the basis of only the position and size of the 3D models M, which are supplied from the 3D model control unit 126, without reflecting the result of the viewpoint detection in the rendering.

[Operation of Information Processing Apparatus]

An operation of the information processing apparatus 120 will be described. FIG. 19 is a flowchart showing an operation of the information processing apparatus 120.

If an instruction to display the 3D model M is given, the display space acquiring unit 124 acquires a display space size (see FIG. 2) (St101). The display space acquiring unit 124 supplies the acquired display space size to the change processing execution determining unit 125 and the 3D model control unit 126.

Subsequently, the viewpoint position determining unit 122 determines a display viewpoint position T (see FIGS. 7A and 7B) (St102). The viewpoint position determining unit 122 can set the designated viewpoint position P acquired from the 3D content retaining unit 121 or the viewpoint position obtained by moving the designated viewpoint position P, as the display viewpoint position T. The viewpoint position determining unit 122 supplies the display viewpoint position T to the change processing execution determining unit 125 and the 3D model control unit 126.

Subsequently, the region-of-interest specifying unit 123 specifies a region of interest R (see FIGS. 8 to 10) (St103). The region-of-interest specifying unit 123 may acquire a region of interest R from the 3D content retaining unit 121, or may specify a region of interest R from the result of the user viewpoint detection or the arrangement of the 3D models M. The region-of-interest specifying unit 123 supplies the region of interest R to the change processing execution determining unit 125 and the 3D model control unit 126.

Subsequently, the change processing execution determining unit 125 determines whether to execute the change processing by the 3D model control unit 126 (St104). The change processing execution determining unit 125 can make the determination on whether or not the whole of the 3D models of interest MR1 fits in the display space 117 (see FIGS. 11A, 11B, and 11C).

If the whole of the 3D models of interest MR1 fails to fit in the display space 117 (St104: Yes), the 3D model control unit 126 changes the position and size of the 3D models M (see FIGS. 12A and 12B), and moves the 3D models of interest MR into the display space 117 (St105). The 3D model control unit 126 supplies the changed position and size of the 3D models M to the rendering unit 128. On the other hand, if the whole of the 3D models of interest MR1 fits in the display space 117 (St104: No), the 3D model control unit 126 supplies the position and size of the 3D models M to the rendering unit 128 without executing the change processing.

Subsequently, the user viewpoint detecting unit 127 detects the viewpoint position of the user (St106), and supplies the detected viewpoint position to the rendering unit 128. Subsequently, the rendering unit 128 performs rendering on the basis of the position and size of the 3D models M, which are supplied from the 3D model control unit 126 (St107). Further, the rendering unit 128 may perform rendering on the basis of the position and size of the 3D models M and the viewpoint position supplied from the user viewpoint detecting unit 127. After St107, the information processing apparatus 120 repeatedly executes the steps from St102 to St107. Thus, the 3D model M is displayed on the spatial reproduction display 110, and the 3D model of interest $M_R$ is disposed within the display space 117.

Note that the 3D model control unit 126 executes the change processing of the 3D models M if the whole of the 3D models of interest $M_{R1}$ fails to fit in the display space 117 (St104: Yes), but the 3D model control unit 126 may execute the change processing of the 3D models M regardless of the determination result of the change processing execution determining unit 125. Thus, the 3D model control unit 126 can move the 3D models of interest $M_{R2}$ to the center of the display space 117.

[Effects by Spatial Reproduction Display System]

In the spatial reproduction display system 100, if the 3D models of interest $M_{R1}$ protrude from the display space 117 when viewed from the display viewpoint position T as described above, the position and size of the 3D models of interest $M_{R1}$ are changed, and the 3D models of interest $M_{R2}$ are disposed in the display space 117. This allows the user to stereoscopically view the 3D models of interest $M_{R2}$ located within the display space 117.

Assuming that the user U visually recognizes the 3D models of interest $M_R$ protruding from the display space 117, there is a possibility that the user feels uncomfortable or a stereoscopic effect of the 3D models of interest $M_R$ deteriorates. On the other hand, in the spatial reproduction display system 100, it is possible to avoid such a situation and present the 3D models of interest $M_R$ having excellent visibility to the user, and thus possible to improve the ease of interaction between the user U and the 3D models of interest $M_R$ and the stereoscopic effect of the 3D models of interest $M_R$.

Further, examples of the 3D content include existing 3D content such as computer graphics (CG) animations or games, in addition to the 3D content created for the spatial reproduction display. In the spatial reproduction display system 100, the 3D models of interest $M_R$ can be disposed in the display space 117 also in a 3D model space created for the existing 3D content. This makes it possible to achieve improvement in the ease of interaction and the stereoscopic effect also in the existing 3D content.

[Regarding Movement of Display Viewpoint Position and Region of Interest]

The spatial reproduction display system 100 can provide a representation in which a 3D model of interest $M_R$ is located within the display space 117 as described above. Here, if the spatial reproduction display system 100 presents a video in which a 3D model of interest $M_R$ gradually moves away, the display viewpoint position T is to be gradually moved away from the 3D model M.

FIG. 20 is a schematic view showing a user U and a 3D model of interest $M_R$. It is assumed that the user U is visually recognizing the spatial reproduction display 110 from an optimal viewing position in front of the spatial reproduction display 110. When the 3D model of interest $M_{R1}$ and the display viewpoint position T are gradually moved away from each other, the user U recognizes that the 3D model of interest $M_{R1}$ is located outside the display space 117 as shown in FIG. 20. The present technology is applied to such a case, so that even if the 3D model of interest $M_R$ and the display viewpoint position T are gradually moved away from each other, the user can recognize that the 3D model of interest $M_{R2}$ is constantly present in the display space 117 as shown in FIG. 20.

Further, in CG animations or 3D computer games, there are many cases where a virtual camera is disposed in a virtual space in which a 3D model is disposed, and a camerawork is given to the virtual space to represent a 2D video. If such 3D content is displayed on the spatial reproduction display 110, the original 3D content is not designed to fit in the display space 117, but the visibility can be improved by fitting the original 3D content in the display space 117 as much as possible.

In such a case, since the designated viewpoint position P set in advance in the 3D content is the viewpoint position designated by the creator, the designated viewpoint position P can be set as the display viewpoint position T. In addition, if the region-of-interest specifying unit 123 sets a region of interest R within the angle of view obtained when the content is viewed from the display viewpoint position, the present technology can be applied to the above case.

As shown in FIG. 20, the region-of-interest specifying unit 123 can set the region of interest R within the angle of view, which is viewed from the display viewpoint position T, and the 3D model of interest $M_{R2}$ is displayed within the display space 117 accordingly. The viewpoint position determining unit 122 can move the display viewpoint position T in accordance with the elapse of time, and the region-ofinterest specifying unit 123 can move the region of interest R in accordance with the elapse of time. One or both of the display viewpoint position T and the region of interest R are moved in accordance with the elapse of time, so that the camerawork can be represented, and the visibility of the content, such as presenting an important storyline or the like in the display space 117, can be improved.

Further, in 3D content to which a camerawork is given in advance, such as CG animations or 3D computer games, the designated viewpoint position P that is the viewpoint position designated by the content creator does not always face the horizontal direction, and may face a direction obliquely downward or obliquely upward with respect to the horizontal direction. Note that the horizontal direction in this case is a virtual horizontal direction in the 3D content. FIG. 21 is a schematic view showing the user U and the 3D models of interest $M_{R1}$, and showing a state in which the designated viewpoint position P faces an obliquely downward direction.

When a position relationship between the direction of the designated viewpoint position P and the 3D models of interest $M_{R1}$ is applied to the spatial reproduction display 110, the following disadvantage arises. FIGS. 22 and 23 are schematic views each showing the position relationship between the display space 117 and the 3D models of interest $M_R$. There are a case where the designated viewpoint position P faces an obliquely downward direction as shown in FIG. 21, and a case where 3D models of interest $M_{R2}$ are displayed with inclination in the display space 117 when the user U visually recognizes the spatial reproduction display 110 from the front as shown in FIG. 22. Further, there is also a case where the 3D models of interest $M_{R1}$ are not located within the angle of view of the display space 117 as shown in FIG. 23, depending on the direction of the designated viewpoint position P.

If the designated viewpoint position P does not face the horizontal direction as describe above, the viewpoint position determining unit 122 can move the display viewpoint position T from the designated viewpoint position P. FIGS. 24A, 24B, and 24C are schematic views showing a method of changing the position and the direction of the display viewpoint position T. As shown in FIGS. 24A and 24B, the viewpoint position determining unit 122 moves the display viewpoint position T to a position that is horizontal with respect to a midpoint A of the 3D models of interest MR1, and turns the display viewpoint position T in the horizontal direction. Thus, as shown in FIG. 24C, the display viewpoint position T is moved such that the display space 117 is positioned on a straight line connecting the display viewpoint position T and the 3D models of interest MR1, so that the 3D model control unit 126 can arrange the 3D models of interest MR2 within the display space 117.

Note that the information processing apparatus 120 may move one or both of the display viewpoint position T and the region of interest R in accordance with the elapsed time as described above, but may move one or both of the display viewpoint position T and the region of interest R in accordance with an operation input by the user. Specifically, the viewpoint position determining unit 122 can move the display viewpoint position T in accordance with an operation input by the user, and the region-of-interest specifying unit 123 can move the region of interest R in accordance with an operation input by the user.

[Regarding 2D Display of 3D Model]

As described above, the spatial reproduction display system 100 can provide a representation in which the 3D model of interest $M_{R2}$ is located within the display space

117, but there may be a case where a 3D model exists between the display viewpoint position T and the display space 117.

FIG. 25 is a schematic view showing the user U, the display space 117, and 3D models M. As shown in the figure, the 3D models of interest $M_{R2}$ are located in the display space 117, and a 3D model M3 is located over the inside and the outside of the display space 117. Further, a 3D model M4 is located between the display space 117 and the display viewpoint position T. If the spatial reproduction display system 100 displays the 3D models M as they are, the user U visually recognizes a cross section (inside) of the 3D model M3.

Here, the display control unit 129 can generate a 2D image obtained by projecting the 3D models M located outside the display space 117 onto the surface of the display space 117. FIG. 26 is a schematic view showing generation of a 2D image by the 3D model control unit 126. As shown in the figure, the display control unit 129 generates an image G1, which is obtained by projecting the 3D model M3 onto a surface 117a of the display space 117, and an image G2, which is obtained by projecting the 3D model M4 onto the surface 117a.

This makes it possible for the user to visually recognize the image G1 and the image G2 instead of the 3D model M3 and the 3D model M4, and to prevent the cross section (inside) of the 3D model from being visually recognized. Note that the display control unit 129 can generate a 2D image obtained by projecting a 3D model M located outside the display space 117, such as the far side of the display space 117, onto the surface of the display space 117, in addition to the 3D model M located between the display space 117 and the display viewpoint position T.

Further, the 3D model control unit 126 updates the 2D image in accordance with the viewpoint position of the user U, which is supplied from the user viewpoint detecting unit 127. FIGS. 27A and 27B are schematic view showing update of a 2D image by the 3D model control unit 126. As shown in FIGS. 27A and 27B, when the viewpoint position of the user U changes, the 3D model control unit 126 generates a 2D image in accordance with the viewpoint position of the user U.

In addition, the display control unit 129 may perform blurring processing on the 2D image when a 2D image is drawn. FIG. 28 is a schematic view showing a 3D model M and 2D images G subjected to the blurring processing. As shown in the figure, the 2D images G are subjected to the blurring processing, so that the 3D model M located in front of the display space 117 can be represented.

[Regarding Supplementary Indications]

In the spatial reproduction display system 100, even if the 3D model of interest MR1 is located away from the display viewpoint position T, the 3D model of interest MR2 is disposed within the display space 117 as described above. Thus, it may be difficult for the user U to recognize that the 3D model of interest MR1 is located away from the display viewpoint position T. In this regard, the information processing apparatus 120 can allow the user to recognize that the 3D model of interest MR1 is located away from the display viewpoint position T by the following supplementary indications. FIGS. 29A, 29B, 29C, 30, 31A, 31B, 31C, 32A, 32B, 33A, and 33B are schematic views each showing supplementary indications by the information processing apparatus 120.

When a 3D model of interest MR1 in a state of being located within the display space 117 as shown in FIG. 29A is moved away from the display viewpoint position T as shown in FIG. 29B, a 3D model of interest MR2 is disposed within the display space 117 as shown in FIG. 29C. Here, during the processing of changing the 3D model of interest MR1 into the 3D model of interest MR2, the display control unit 129 can change the background of the 3D model M as shown in FIGS. 29B and 30, so that a background in which light flows can be provided. This makes it possible for the user U to recognize that not only the 3D model of interest MR is reduced in size but also the 3D model of interest MR1 is moved away from the display viewpoint position T.

Further, when a 3D model of interest MR1 in a state of being located within the display space 117 as shown in FIG. 31A is moved away from the display viewpoint position T as shown in FIG. 31B, a 3D model of interest MR2 is disposed within the display space 117 as shown in FIG. 31C. Here, during the processing of changing the 3D model of interest MR1 into the 3D model of interest MR2, the display control unit 129 can perform processing of slightly moving the 3D model of interest MR2 to the far side as indicated by the arrow and then returning it to the original position as shown in FIG. 31B. Such display can also allow the user U to recognize that the 3D model MR1 is moved away from the display viewpoint position T.

Further, when a 3D model of interest MR1 in a state of being located within the display space 117 as shown in FIG. 32A is moved away from the display viewpoint position T as shown in FIG. 32B, a 3D model of interest MR2 is disposed within the display space 117. Here, the display control unit 129 does not change the background of the 3D model M, and can perform display in which the background protrudes outside the display space 117. Specifically, the display control unit 129 can retain a background model such as clouds separately from the 3D model M, render the background model only within the display space 117, and provide a representation in which the background model flows to the far side, for example. Such display can also allow the user U to recognize that the 3D model MR1 is moved away from the display viewpoint position T.

In addition, when a 3D model of interest MR1 in a state of being located within the display space 117 as shown in FIG. 33A is moved away from the display viewpoint position T as shown in FIG. 33B, a 3D model of interest MR2 is disposed within the display space 117. Here, as shown in FIGS. 33A and 33B, the display control unit 129 can display, together with the 3D model of interest MR, a distance between the display viewpoint position T and the 3D model of interest MR by using an indicative item such as a character string or meters. Such display can also allow the user U to recognize that the 3D model MR1 is moved away from the display viewpoint position T.

[Regarding Display Space Size]

In the spatial reproduction display system 100, the display space acquiring unit 124 acquires the size of the display space 117 as described above. Here, in the spatial reproduction display 110, the size of the display space 117 may be changed. FIG. 34 is a schematic view showing a change in size of the display space 117. As shown in the figure, in the spatial reproduction display 110, the size of the display space 117 can be changed by adjusting the inclination angle of the display region 116.

When the size of the display space 117 is changed, the display space acquiring unit 124 acquires a new size of the display space 117 and supplies the new size to the change processing execution determining unit 125 and the 3D model control unit 126. The change processing execution determining unit 125 and the 3D model control unit 126 can execute the above processing on the basis of the new size of the display space 117.

[Regarding Spatial Reproduction Display]

The present technology can be used in the spatial reproduction display 110 that allows stereoscopic display to be provided as if a 3D model M really exists in the display space 117. Here, the spatial reproduction display 110 is not limited to one existing in the real space, and may be a spatial reproduction display that is virtually disposed in a space formed by augmented reality (AR) glasses or virtual reality (VR)/a head mounted display (HMD).

[Hardware Configuration of Information Processing Apparatus]

A hardware configuration that makes it possible to implement a functional configuration of the information processing apparatus 120 will be described. FIG. 35 is a schematic view showing a hardware configuration of the information processing apparatus 120.

As shown in the figure, the information processing apparatus 120 includes a central processing unit (CPU) 1001 and a graphics processing unit (GPU) 1002. An input/output interface 1006 is connected to the CPU 1001 and the GPU 1002 via a bus 1005. A read only memory (ROM) 1003 and a random access memory (RAM) 1004 are connected to the bus 1005.

An input unit 1007, an output unit 1008, a storage unit 1009, and a communication unit 1010 are connected to the input/output interface 1006. The input unit 1007 includes input devices such as a keyboard and a mouse that are used by a user to input an operation command. The output unit 1008 outputs a processing operation screen and an image of a processing result to a display device. The storage unit 1009 includes, for example, a hard disk drive that stores therein a program and various types of data. The communication unit 1010 includes, for example, a local area network (LAN) adapter, and performs communication processing through a network as represented by the Internet. Further, a drive 1011 is connected to the input/output interface 1006. The drive 1011 reads data from and writes data into a removable storage medium 1012 such as a magnetic disk, an optical disc, a magneto-optical disc, or a semiconductor memory.

The CPU 1001 performs various processes in accordance with a program stored in the ROM 1003, or in accordance with a program that is read from the removable storage medium 1012 such as a magnetic disk, an optical disc, a magneto-optical disc, or a semiconductor memory to be installed on the storage unit 1009, and is loaded into the RAM 1004 from the storage unit 1009. Data necessary for the CPU 1001 to perform various processes is also stored in the RAM 1004 as necessary. The GPU 1002 performs calculation processing necessary to draw an image under the control of the CPU 1001.

In the information processing apparatus 120 having the configuration described above, the series of processes described above is performed by the CPU 1001 loading, for example, a program stored in the storage unit 1009 into the RAM 1004 and executing the program via the input/output interface 1006 and the bus 1005.

For example, the program executed by the information processing apparatus 120 can be provided by being recorded in the removable storage medium 1012 serving as, for example, a package medium. Further, the program can be provided via a wired or wireless transmission medium such as a local area network, the Internet, or digital satellite broadcasting.

In the information processing apparatus 120, the program can be installed on the storage unit 1009 via the input/output interface 1006 by the removable storage medium 1012 being mounted on the drive 1011. Further, the program can be received by the communication unit 1010 via the wired or wireless transmission medium to be installed on the storage unit 1009. Moreover, the program can be installed in advance on the ROM 1003 or the storage unit 1009.

Note that the program executed by the information processing apparatus 120 may be a program in which processes are chronologically performed in the order of the description in the present disclosure, or may be a program in which processes are performed in parallel or a process is performed at a necessary timing such as a timing of calling.

All of the hardware configuration of the information processing apparatus 120 does not have to be included in a single apparatus, and the information processing apparatus 120 may include a plurality of apparatuses. Further, a portion of or all of the hardware configuration of the information processing apparatus 120 may be included in a plurality of apparatuses connected to each other via a network.

[Regarding Present Disclosure]

The effects described in the present disclosure are merely examples and are not limited, and other effects may be obtained. The above description of the plurality of effects does not necessarily mean that the effects are exerted at the same time. It is meant that at least any one of the effects described above can be obtained depending on the conditions and the like, and there is a possibility that effects not described in the present disclosure can be exhibited. Further, at least two feature portions of the feature portions described in the present disclosure can be discretionally combined with each other.

Note that the present technology may also take the following configurations.

(1) An information processing apparatus, including:

a viewpoint position determining unit that determines, in 3D content presented by a spatial reproduction display capable of stereoscopically displaying a 3D model, a viewpoint position with respect to the 3D model;

a region-of-interest specifying unit that specifies a region of interest including at least a part of the 3D model;

a display space acquiring unit that acquires a size of a display space for displaying the 3D model on the spatial reproduction display; and a display control unit that changes, using the 3D model included in the region of interest as a 3D model of interest, a position of the 3D model of interest with respect to the viewpoint position to a position located within the display space on the basis of the viewpoint position, the region of interest, and the size of the display space, and causes the spatial reproduction display to stereoscopically display the 3D model.

(2) The information processing apparatus according to (1), in which the display control unit changes the position of the 3D model of interest to the position located within the display space by reducing a distance between the viewpoint position and the 3D model of interest at a first ratio, and reduces a size of the 3D model of interest at a second ratio that is identical to the first ratio.

(3) The information processing apparatus according to (1), in which the display control unit changes the position of the 3D model of interest to the position located within the display space by reducing a distance between the viewpoint position and the 3D model of interest at a first ratio, and reduces a size of the 3D model of interest at a second ratio at which a whole of the 3D model of interest fits in the display space.

(4) The information processing apparatus according to (2) or (3), in which the display control unit reduces a distance between the viewpoint position and the 3D model at the first ratio, and reduces a size of the 3D model at the second ratio.

(5) The information processing apparatus according to any one of (1) to (4), in which the viewpoint position determining unit moves the viewpoint position in accordance with an operation input by a user.

(6) The information processing apparatus according to any one of (1) to (5), in which the region-of-interest specifying unit moves the region of interest in accordance with an operation input by a user.

(7) The information processing apparatus according to any one of (1) to (6), in which the viewpoint position determining unit moves the viewpoint position in accordance with elapse of time.

(8) The information processing apparatus according to any one of (1) to (7), in which the region-of-interest specifying unit moves the region of interest in accordance with elapse of time.

(9) The information processing apparatus according to any one of (1) to (8), in which the display control unit generates a 2D image obtained by projecting the 3D model located outside the display space onto a surface of the display space, and causes the spatial reproduction display to display the 2D image.

(10) The information processing apparatus according to (9), in which the display control unit projects the 3D model located between the viewpoint position and the display space onto a surface of the display space on a side of the viewpoint position, and generates the 2D image.

(11) The information processing apparatus according to (10), in which the display control unit performs blurring processing on the 2D image.

(12) The information processing apparatus according to any one of (1) to (11), in which the viewpoint position determining unit sets, as the viewpoint position, a viewpoint position specified in the 3D content.

(13) The information processing apparatus according to any one of (1) to (11), in which the viewpoint position determining unit moves a viewpoint position specified in the 3D content such that the display space is positioned on a straight line connecting the viewpoint position and the 3D model of interest, and sets the specified viewpoint position as the viewpoint position.

(14) The information processing apparatus according to any one of (1) to (13), in which the region-of-interest specifying unit specifies, as the region of interest, a region of interest specified in the 3D content.

(15) The information processing apparatus according to any one of (1) to (13), in which the region-of-interest specifying unit specifies the region of interest on the basis of a detection result of a viewpoint of the user.

(16) The information processing apparatus according to any one of (1) to (13), in which the region-of-interest specifying unit specifies the region of interest on the basis of arrangement of the 3D model.

(17) The information processing apparatus according to any one of (1) to (16), in which the display control unit generates a right-eye model image and a left-eye model image that are parallax images of the 3D model viewed from the viewpoint position, and causes the spatial reproduction display to display the right-eye model image and the left-eye model image, to stereoscopically display the 3D model.

(18) The information processing apparatus according to any one of (1) to (17), in which the display control unit changes a direction of the 3D model in accordance with a detection result of a viewpoint of the user.

(19) A program, which causes an information processing apparatus to operate as:

a viewpoint position determining unit that determines, in 3D content presented by a spatial reproduction display capable of stereoscopically displaying a 3D model, a viewpoint position with respect to the 3D model;

a region-of-interest specifying unit that specifies a region of interest including at least a part of the 3D model;

a display space acquiring unit that acquires a size of a display space for displaying the 3D model on the spatial reproduction display; and a display control unit that changes, using the 3D model included in the region of interest as a 3D model of interest, a position of the 3D model of interest with respect to the viewpoint position to a position located within the display space on the basis of the viewpoint position, the region of interest, and the size of the display space, and causes the spatial reproduction display to stereoscopically display the 3D model.

(20) An information processing method, including:

determining, in 3D content presented by a spatial reproduction display capable of stereoscopically displaying a 3D model, a viewpoint position with respect to the 3D model; specifying a region of interest including at least a part of the 3D model;

acquiring a size of a display space for displaying the 3D model on the spatial reproduction display; and changing, using the 3D model included in the region of interest as a 3D model of interest, a position of the 3D model of interest with respect to the viewpoint position to a position located within the display space on the basis of the viewpoint position, the region of interest, and the size of the display space, and causing the spatial reproduction display to stereoscopically display the 3D model.

REFERENCE SIGNS LIST 100 spatial reproduction display system
110 spatial reproduction display
116 display region 117 display space
120 information processing apparatus
121 3D content retaining unit
122 viewpoint position determining unit
123 region-of-interest specifying unit
124 display space acquiring unit
125 change processing execution determining unit
126 3D model control unit
127 user viewpoint detecting unit
128 rendering unit
129 display control unit

The invention claimed is:

1. An information processing apparatus, comprising:

a central processing unit (CPU) configured to:

determine, in 3D content, a first viewpoint position with respect to a 3D model, wherein a spatial reproduction display stereoscopically displays the 3D model;

determine a first region of interest that includes at least a part of the 3D model, wherein the first region of interest corresponds to a 3D model of interest;

acquire a size of a display space, wherein the spatial reproduction display displays the 3D model based on the size of the display space; and change, a position of the 3D model of interest to a specific position that is within the display space, based on the first viewpoint position, the first region of interest, the size of the display space, and the part of the 3D model, wherein the spatial reproduction display stereoscopically displays the 3D model based on the change of the position of the 3D model of interest.

2. The information processing apparatus according to claim 1, wherein the CPU is further configured to:

reduce a first distance between the first viewpoint position and the 3D model of interest based on a first ratio;

reduce a size of the 3D model of interest based on a second ratio that is identical to the first ratio; and change the position of the 3D model of interest to the specific position within the display space based on each of the reduction of the first distance and the reduction of the size of the 3D model of interest.

3. The information processing apparatus according to claim 1, wherein the CPU is further configured to:

reduce a distance between the first viewpoint position and the 3D model of interest based on a first ratio;

reduce a size of the 3D model of interest based on a second ratio different from the first ratio; and change the position of the 3D model of interest to the specific position within the display space based on each of the reduction of the distance and the reduction of the size of the 3D model of interest, wherein a whole of the 3D model of interest fits in the display space.

4. The information processing apparatus according to claim 2, wherein the CPU is further configured to:

reduce a second distance between the first viewpoint position and the 3D model based on the first ratio; and reduce the size of the 3D model based on the second ratio.

5. The information processing apparatus according to claim 1, wherein the CPU is further configured to move the first viewpoint position based on a user input.

6. The information processing apparatus according to claim 1, wherein the CPU is further configured to move the first region of interest based on a user input.

7. The information processing apparatus according to claim 1, wherein the CPU is further configured to move the first viewpoint position based on an elapse of time.

8. The information processing apparatus according to claim 1, wherein the CPU is further configured to move the first region of interest based on an elapse of time.

9. The information processing apparatus according to claim 1, wherein the CPU is further configured to:

control projection of the 3D model onto a surface of the display space; and generate a 2D image based on the projection of the 3D model, wherein the projection of the 3D model is outside the display space, and the spatial reproduction display displays the 2D image.

10. The information processing apparatus according to claim 9, wherein the CPU is further configured to:

control the projection of the 3D model between the first viewpoint position and the display space, wherein the projection of the 3D model is on the surface of the display space, and the surface of the display space is on a side of the first viewpoint position; and generate the 2D image.

11. The information processing apparatus according to claim 10, wherein the CPU is further configured to perform a blurring process on the 2D image.

12. The information processing apparatus according to claim 1, wherein the CPU is further configured to set, as the first viewpoint position, a second viewpoint position in the 3D content.

13. The information processing apparatus according to claim 1, wherein the CPU is further configured to:

move a second viewpoint position in the 3D content to position the display space on a straight line, wherein the straight line connects the first viewpoint position and the 3D model of interest; and set the second viewpoint position as the first viewpoint position.

14. The information processing apparatus according to claim 1, wherein the CPU is further configured to determine, as the first region of interest, a second region of interest in the 3D content.

15. The information processing apparatus according to claim 1, wherein the CPU is further configured to determine the first region of interest based on a detection result of a viewpoint of a user.

16. The information processing apparatus according to claim 1, wherein the CPU is further configured to determine the first region of interest based on an arrangement of the 3D model.

17. The information processing apparatus according to claim 1, wherein the CPU is further configured to generate each of a right-eye model image and a left-eye model image, each of the right-eye model image and the left-eye model image is a parallax image of the 3D model, the 3D model is viewed from the first viewpoint position, and the spatial reproduction display displays each of the right-eye model image and the left-eye model image to stereoscopically display the 3D model.

18. The information processing apparatus according to claim 1, wherein the CPU is further configured to change a direction of the 3D model based on a detection result of a viewpoint of a user.

19. A non-transitory computer-readable medium having stored thereon, computer-executable instructions which when executed by a processor, cause the processor to execute operations, the operations comprising:

determining, in 3D content, a viewpoint position with respect to a 3D model, wherein a spatial reproduction display stereoscopically displays the 3D model;

determining a region of interest that includes at least a part of the 3D model, wherein the region of interest corresponds to a 3D model of interest;

acquiring a size of a display space, wherein the spatial reproduction display displays the 3D model based on the size of the display space; and changing a position of the 3D model of interest to a specific position that is within the display space, based on of the viewpoint position, the region of interest, the size of the display space, and the part of the 3D model, wherein the spatial reproduction display stereoscopically displays the 3D model based on the change of the position of the 3D model of interest.

20. An information processing method, comprising:

in an information processing apparatus:

determining, in 3D content, a viewpoint position with respect to a 3D model, wherein a spatial reproduction display stereoscopically displays the 3D model;

determining a region of interest that includes at least a part of the 3D model, wherein the region of interest corresponds to a 3D model of interest;

acquiring a size of a display space, wherein the spatial reproduction display displays the 3D model based on the size of the display space; and changing a position of the 3D model of interest to a specific position that is within the display space, based on of the viewpoint position, the region of interest, the size of the display space, and the part of the 3D model, wherein the spatial reproduction display stereoscopically displays the 3D model based on the change of the position of the 3D model of interest.

* * * * *